US012561166B2

(12) United States Patent
Naserimojarad

(10) Patent No.: US 12,561,166 B2
(45) Date of Patent: Feb. 24, 2026

(54) SYSTEMS AND METHODS FOR ENERGY-INTELLIGENT COMPUTING POWER

(71) Applicant: LOD Technologies Inc., Burnaby (CA)

(72) Inventor: Medi Naserimojarad, Vancouver (CA)

(73) Assignee: LOD Technologies Inc., Burnaby (CA)

( * ) Notice: Subject to any disclaimer, the term of this patent is extended or adjusted under 35 U.S.C. 154(b) by 0 days.

(21) Appl. No.: 18/989,966

(22) Filed: Dec. 20, 2024

(65) Prior Publication Data

US 2025/0251974 A1 Aug. 7, 2025

Related U.S. Application Data

(60) Provisional application No. 63/679,968, filed on Aug. 6, 2024, provisional application No. 63/548,720, filed on Feb. 1, 2024.

(51) Int. Cl.
| | |
|---|---|
| *G06F 9/46* | (2006.01) |
| *G06F 9/48* | (2006.01) |
| *G06F 9/50* | (2006.01) |
| *G06Q 50/06* | (2012.01) |

(52) U.S. Cl.
CPC .......... *G06F 9/4893* (2013.01); *G06F 9/5027* (2013.01); *G06Q 50/06* (2013.01)

(58) Field of Classification Search
CPC ...... G06F 9/4893; G06F 9/5027; G06Q 50/06
See application file for complete search history.

(56) References Cited

U.S. PATENT DOCUMENTS

| | | | |
|---|---|---|---|
| 2013/0219068 A1* | 8/2013 | Ballani | ................ G06Q 10/063 709/226 |
| 2025/0060996 A1* | 2/2025 | Lee | ........................ G06F 9/4893 |

* cited by examiner

*Primary Examiner* — Gregory A Kessler
(74) *Attorney, Agent, or Firm* — Own Innovation; James W. Hinton; Daniel Biggs

(57) ABSTRACT

Systems and methods for managing a computing task are provided. The system includes a controller configured to receive the computing task, present to a client a set of factors defining desired conditions related to executing the computing task, receive a demand computing strategy associated with the computing task indicating one or more factors selected by the client and a constraint and a weight related to each factor from the one or more selected factors, receive a plurality of supply computing strategies from a plurality of datacenters, each supply computing strategy corresponding to a datacenter from the plurality of datacenters, calculate a task scheduling strategy based at least on the demand computing strategy and a supply computing strategy, select a candidate datacenter from the plurality of datacenters according to a predetermined rule, and schedule the computing task for execution on the candidate datacenter according to the task scheduling strategy.

27 Claims, 8 Drawing Sheets

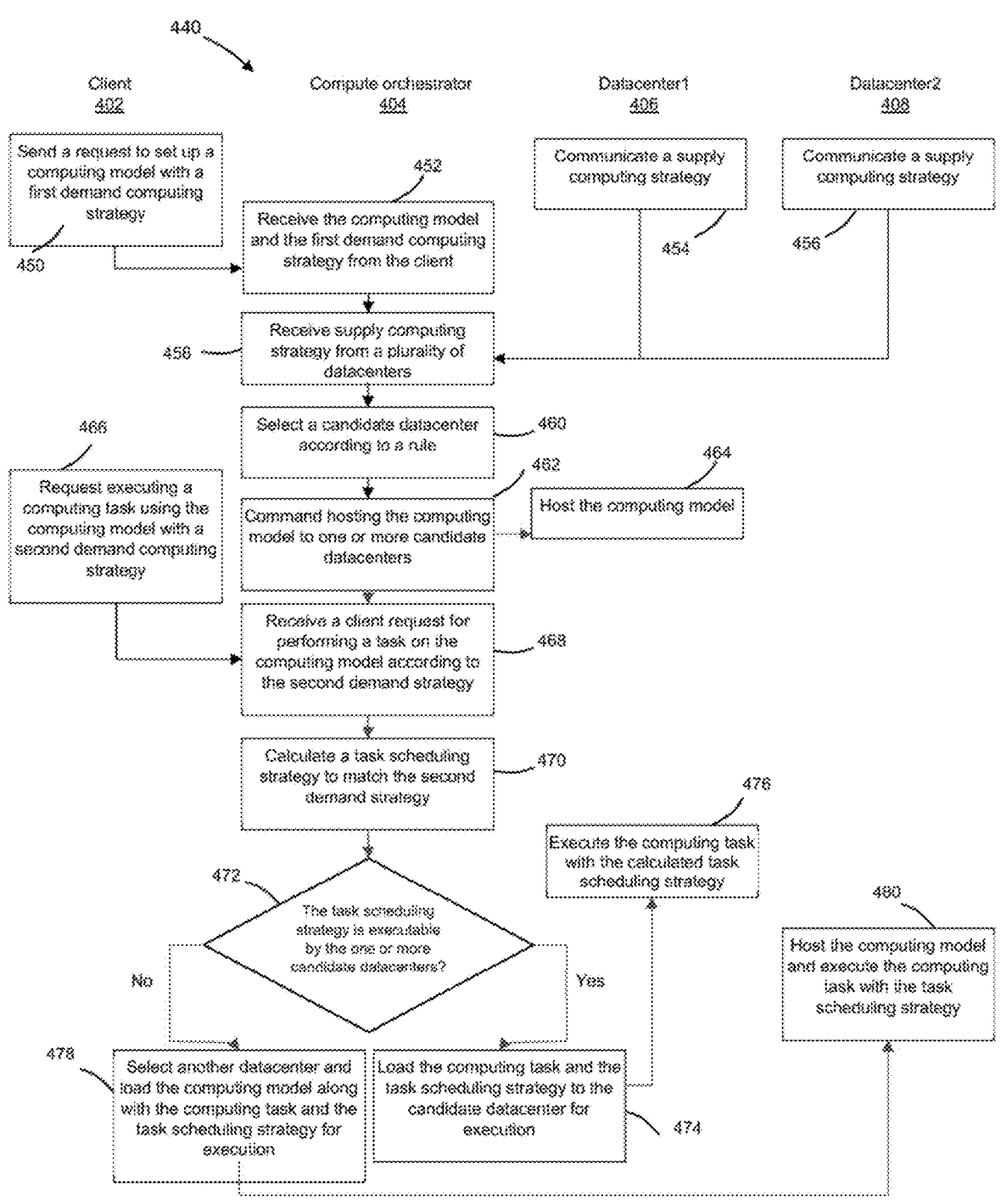

440

Client
402

Compute orchestrator
404

Datacenter1
406

Datacenter2
408

Send a request to set up a computing model with a first demand computing strategy

450

452

Receive the computing model and the first demand computing strategy from the client Communicate a supply computing strategy Communicate a supply computing strategy

454

456

458

Receive supply computing strategy from a plurality of datacenters

466

Select a candidate datacenter according to a rule

460

Request executing a computing task using the computing model with a second demand computing strategy

462

Command hosting the computing model to one or more candidate datacenters

464

Host the computing model

Receive a client request for performing a task on the computing model according to the second demand strategy

468

Calculate a task scheduling strategy to match the second demand strategy

470

476

Execute the computing task with the calculated task scheduling strategy

472

The task scheduling strategy is executable by the one or more candidate datacenters?

No

Yes

480

Host the computing model and execute the computing task with the task scheduling strategy

478

Select another datacenter and load the computing model along with the computing task and the task scheduling strategy for execution Load the computing task and the task scheduling strategy to the candidate datacenter for execution

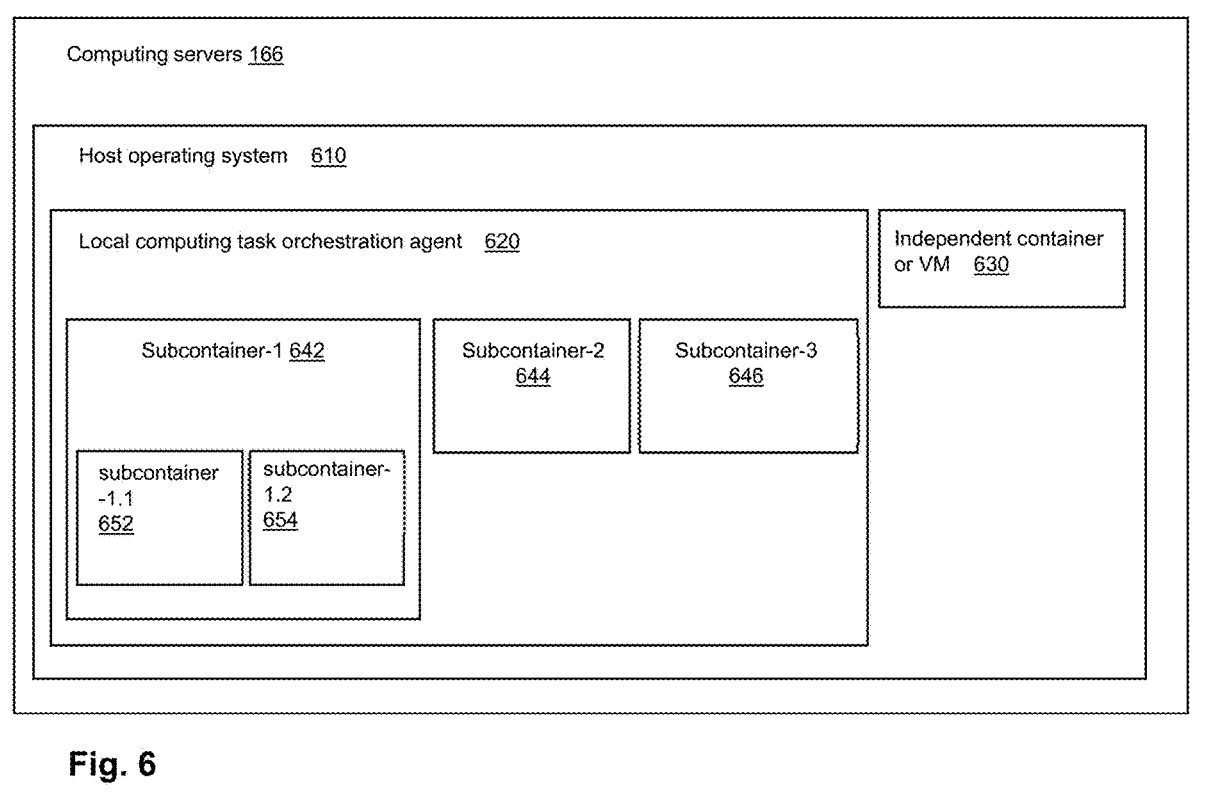

Computing servers 166

Host operating system   610

Local computing task orchestration agent   620

Independent container or VM   630

Subcontainer-1 642

Subcontainer-2 644

Subcontainer-3 646 subcontainer -1.1 652 subcontainer- 1.2 654

Fig. 6

SYSTEMS AND METHODS FOR ENERGY-INTELLIGENT COMPUTING POWER

TECHNICAL FIELD

The present disclosure generally relates to energy-intelligent computing power orchestration, and more particularly relates to energy-intelligent systems and methods for managing requests for scheduling a computing task.

BACKGROUND

In today's rapidly expanding digital environment, the demand is increasing for computational power and its related infrastructure, such as data centers and servers. However, meeting this growing demand for computing resources is hampered by a bottleneck in the supply chain. This bottleneck is primarily attributed to the inadequate expansion of infrastructure and restricted access to affordable and sustainable energy sources. Unfortunately, this issue does not appear to have an immediate solution using conventional means due to the rapid growth in demand and the slow, costly process of constructing data centers and related infrastructure.

Conversely, data centers that supply computing power face challenges with narrow profit margins attributable to intense competition. Their sole revenue source is the provision of computing services. Market standards emphasizing redundancy and uptime have compelled data centers to operate as rigid loads, maintaining a baseline electricity consumption. Despite possessing the capability to be flexible in scheduling computing tasks and energy use, the prevailing standards often limit this flexibility.

Flexible computing opens avenues for advanced energy strategies, yielding considerable monetary revenues (e.g., $100,000 to $400,000 per MW per year) for high-performance computing (HPC) operators sourced from utility grid operators (energy incentives).

Lately, flexible energy consumers such as data centers are receiving incentives to adopt more energy-efficient practices. For instance, in certain jurisdictions such as Texas, where the Electric Reliability Council of Texas (ERCOT) oversees the electricity market, data centers are encouraged to modify their load during periods of high demand or elevated electricity prices. Such data centers may also participate in ancillary service programs or become involved in the real-time supply and demand balancing process, known as SCED in ERCOT, as a controllable load resource.

The current challenge arises from the fact that prevailing standards and the demands of computing consumers necessitate data centers to adopt a consistent strategy centered on maintaining redundancy and uptime. Consequently, pursuing advanced energy strategies and accessing energy incentives becomes impractical. Additionally, the construction of new data centers is approached with the mindset of adhering to the same high standards as top-tier data centers (commonly referred to as tier 4 data centers). This not only significantly increases the time and cost of construction but also exacerbates the supply constraint issue, especially in light of the sharp increase in demand.

Accordingly, a flexible computing load scheduling and routing system and method is desired that overcomes at least some of the foregoing disadvantages. The proposed solutions may be used for scenarios where cost reduction for end consumers harmonizes with potential revenue generations for computing power suppliers through their participation in grid programs and access to energy incentives.

SUMMARY

Disclosed herein are systems and methods for managing a computing task requested by a client. According to one disclosed aspect, a system for managing a computing task requested by a client is provided. The system includes a controller including a communication circuit, a processor, and a memory storing instructions executable by the processor to cause the controller to: receive, from the client, the computing task; present to the client a set of factors, the set of factors defining desired conditions related to executing the computing task; receive, from the client, a demand computing strategy associated with the computing task, the demand computing strategy indicating one or more factors, from the set of factors, selected by the client, and a constraint and a weight related to each factor from the one or more selected factors; receive a plurality of supply computing strategies from a plurality of datacenters, each supply computing strategy from the plurality of supply computing strategies corresponding to a datacenter from the plurality of datacenters; calculate a task scheduling strategy at least based on the demand computing strategy and a supply computing strategy from the plurality of supply computing strategies; select a candidate datacenter from the plurality of datacenters according to a predetermined rule; and schedule the computing task for execution on the candidate datacenter according to the task scheduling strategy.

The controller may further generate commands to acquire energy for the candidate datacenter to execute the computing task, from an energy source.

The energy source may include any one or more of: an energy grid; a behind-the-meter energy generation source; and a backup energy storage unit.

The predetermined rule may be based on one or more of: the task scheduling strategy; computing capacity of each datacenter from the plurality of datacenters; and instructions from the client.

The candidate datacenter may further includes a local controller communicatively coupled to the controller, and the controller may send a command to the local controller to adjust energy consumption of the datacenter and schedule the computing task based on compliance obligations or monetization on energy resources allocated to the candidate datacenter according to an energy agreement.

The command to the local controller to adjust energy consumption may be configured to meet or follow a target power consumption profile by the candidate datacenter. The commands may include one or more of: adjusting the amount of energy sourced to the candidate datacenter; adjusting the amount of computing tasks (i.e., computing workload) sent to the candidate datacenter for execution; adjusting computing hardware configuration of the candidate datacenter; and adjusting the amount of computing capacity dedicated to the computing task. Adjusting the amount of computing tasks may further comprise scheduling various types of computing tasks.

The computing task may include one or more of: a computing model training task; a computing model fine-tuning task; a computing model inference task; a computing model hosting task; a computing model deployment task; a computing model loading task; a computing model execution task; a data processing task; and a cryptocurrency mining task.

The set of factors may include any two or more of: computing power cost; energy cost related to the total energy consumed for the execution of the computing task; availability and redundancy of a datacenter; computing performance of a datacenter; latency in communications with a datacenter; compliance to a regulation; jurisdiction or region where the computing task or a portion of the computing task is to be executed; the environmental impact related to executing of the computing task; and type of energy source used for executing the computing task. The environmental impact may include energy sourcing impacts and computing impacts.

The supply computing strategy may include any one or more of: deciding between monetizing computing power or monetizing allocated energy to the datacenter according to an energy agreement; the type of computing resources desired for executing the computing task; the price of energy desired for executing the computing task; maximizing monetary revenues of the datacenter; optimizing the expenses of the datacenter; maximizing profits or profit margins for the datacenter; the obligations mandated by an energy agreement between an energy source and the candidate datacenter; the availability of various energy generating sources to the candidate datacenter; maintaining or following a certain energy consumption profile over time for the candidate datacenter; the compliance of the computing task to a data policy; meeting financial goals of the candidate datacenter; and the environmental impact related to executing the computing task. Maximizing the profits or profit margins for the candidate datacenter may include selecting one or more computing models from a plurality of computing models for hosting on the candidate datacenter, the one or more computing models producing higher profits or profit margins compared to other available computing models from the plurality of computing models. Maximizing the profits or profit margins for the candidate datacenter may include prioritizing executing a first computing task over executing a second computing task, the first computing task producing higher profits or profit margins compared to the second computing task.

The task scheduling strategy may include one or more of: selecting the candidate datacenter from the plurality of datacenters; changing the candidate datacenter from a first datacenter among the plurality of datacenters to a second datacenter among the plurality of datacenters; a certain time at which the computing task is scheduled for execution on the candidate datacenter; scheduling execution of the computing task on the candidate datacenter once a predetermined execution condition is met; splitting the computing task to a plurality of computing subtasks, and scheduling each subtask from the plurality of subtasks for execution on the candidate datacenter; selecting one or more computing models from a plurality of computing models for hosting and/or deployment on the candidate datacenter; stopping execution of an existing computing task on the candidate datacenter and instead executing the computing task; stopping execution of the computing task from the first datacenter and resuming execution of the computing task on the second datacenter; and modifying execution of the computing tasks by overclocking or underclocking computing hardware of the candidate datacenter.

The computing task may include deploying a computing model and splitting the computing task to a plurality of computing subtasks including a first subtask to host the computing model on the candidate datacenter and a second subtask to use the hosted computing model. The second subtask may further split to a third subtask to load the hosted computing model on a processor of the candidate datacenter and a fourth subtask to execute a process on the loaded computing model.

The computing task may include executing a computing process on a computing model that is hosted and loaded on the candidate datacenter. The computing task may include executing a computing process on a computing model that is hosted on the candidate datacenter, and splitting the computing task to a plurality of computing subtasks including a first subtask to stop executing an existing computing process on the computing model and a second subtask to execute the computing process on the computing model. The computing task may include executing a computing process on a computing model that is not hosted on the candidate datacenter, and splitting the computing task to a plurality of computing subtasks including a first subtask to cause unhosting an existing computing model from the candidate datacenter, a second subtask to host the computing model on the candidate datacenter, a third subtask to load the computing model on a processor of the candidate datacenter, and a fourth subtask to execute the computing process on the computing model. The computing task may include deploying a computing model and splitting the computing task to a plurality of computing subtasks including a first subtask to load a container or virtual machine on the candidate datacenter, a second subtask to load the computing model in the container and/or virtual machine, and a third subtask to run the computing model. The computing task may include deploying a computing model and splitting the computing task to a plurality of computing subtasks includes a first subtask to load a first container or virtual machine on the candidate datacenter, a second subtask to load a second container or virtual machine in the first container or virtual machine, a third subtask to load the computing model in the second container or virtual machine, and a fourth subtask to run the computing model.

Stopping execution of the computing task may include a graceful stop including recording a last state and/or checkpoint related to the computing task. Resuming the computing task may include recalling the recorded last state and/or checkpoint related to the computing task.

In accordance with another disclosed aspect, another system for managing a computing task requested by a client is provided. The system includes a controller including a communication circuit, a processor, and a memory storing instructions executable by the processor to cause the controller to: receive, from the client, the computing task and a demand computing strategy associated with the computing tasks; receive a plurality of supply computing strategies from a plurality of datacenters, each supply computing strategy from the plurality of supply computing strategies corresponding to a datacenter from the plurality of datacenters; the supply computing strategy at least including deciding between monetizing computing power or avoiding energy consumption of the datacenter according to a compliance obligation; calculate a task scheduling strategy at least based on the demand computing strategy and a supply computing strategy from the plurality of supply computing strategies; select a candidate datacenter from the plurality of datacenters at least based on the task scheduling strategy; and schedule the computing task for execution on the candidate datacenter.

According to yet another aspect, a method for managing computing task orchestration is presented. The method includes: receiving, by a controller, an initial computing model from a client; receiving, by the controller, from the client, a first demand computing strategy item regarding hosting the initial computing model; receiving, by the controller, from a plurality of datacenters, a set of supply computing strategies, each supply computing strategy being related to a datacenter from the plurality of datacenters; selecting, by the controller, a candidate datacenter from the plurality of datacenters according to a predetermined rule; loading, by the controller, the initial computing model to the candidate datacenter for hosting; receiving, by the controller, a client request for performing a computing task using the initial computing model, with a second demand computing strategy; calculating, by the controller, a task scheduling strategy at least based on the second demand computing strategy and the supply computing strategy of the candidate datacenter; determining, by the controller, whether or that the computing task is executable by the candidate datacenter according to the task scheduling strategy; scheduling, by the controller, the computing task for execution on the candidate datacenter according to the task scheduling strategy, if the computing task is executable by the candidate datacenter according to the task scheduling strategy; otherwise, selecting, by the controller, a backup datacenter from the plurality of datacenters according to the predetermined rule; and loading, by the controller, the initial computing model and the computing task to the backup datacenter for hosting and execution according to the task scheduling strategy.

The backup datacenter may be selected based on a preferred datacenter selected by the client or the candidate datacenter.

The predetermined rule may include a supply computing strategy that matches with the first demand computing strategy. The predetermined rule may include optimizing a fitness function including the supply computing strategy.

A system for managing a computing task requested by a client is provided. The system includes a controller including a communication circuit, a processor, and a memory having stored thereon computer-executable instructions that, when executed by the processor, cause the controller to receive, from a client device, the computing task, receive, from the client device, a demand computing strategy associated with the computing task, the demand computing strategy indicating one or more factors selected by the client, receive a plurality of supply computing specifications from a plurality of datacenters, at least one supply computing specification from the plurality of supply computing specifications corresponding to each datacenter from the plurality of datacenters, calculate a task routing strategy based at least on the demand computing strategy and a supply computing specification from the plurality of supply computing specifications, select a candidate datacenter from the plurality of datacenters according to a predetermined rule, and route the computing task for execution on the candidate datacenter according to the task routing strategy.

The client device may be a client terminal, a user interface, an application programming interface (API), or a programming terminal.

The system may further cause the controller to present to the client device a set of factors including the one or more factors, the set of factors defining desired conditions related to executing the computing task, and the controller may receive, from the client device, the demand computing strategy indicating the one or more factors, from the set of factors, selected by the client, and a constraint and a weight related to each factor from the one or more selected factors.

The task routing strategy may include a task scheduling strategy.

The system may further cause the controller to use a global traffic manager, and the global traffic manager may be configured to receive the computing task and route the computing task to the candidate datacenter.

The system may further cause the controller to use a benchmarking module, and the benchmarking module may be configured to obtain the plurality of supply computing specifications from the plurality of datacenters.

The supply computing specification may further include a supply computing strategy.

The controller may generate commands to control an energy source of the candidate datacenter to execute the computing task.

The energy source may include one or more of an energy grid, a behind-the-meter energy generation source, and a backup energy storage unit.

The predetermined rule may be based on one or more of the calculated task routing strategy, a computing capacity of each datacenter from the plurality of datacenters, information from the benchmarking module, and instructions received from the client.

The candidate datacenter may further include a local controller communicatively coupled to the controller, and the controller may send a command to the local controller to adjust energy consumption of the candidate datacenter and schedule the computing task based on compliance obligations or monetization on energy resources allocated to the candidate datacenter according to an energy agreement.

The command to the local controller to adjust the energy consumption may be configured to meet or follow a target power consumption profile by the candidate datacenter.

The command to the local controller to adjust the energy consumption may include one or more of adjusting the amount of energy sourced to the candidate datacenter, adjusting the amount of computing tasks sent to the candidate datacenter for execution, adjusting a computing hardware configuration of the candidate datacenter, and adjusting the amount of computing capacity dedicated to the computing task.

Adjusting the amount of the computing tasks may include scheduling various types of the computing tasks.

Each computing task may include one or more of a computing model training task, a computing model fine-tuning task, a computing model inference task, a computing model hosting task, a computing model deployment task, a computing model loading task, a computing model execution task, a data processing task, and a cryptocurrency mining task.

The set of factors may include two or more of computing power cost, energy cost related to the total energy consumed for the execution of the computing task, availability and redundancy of a datacenter, computing performance of a datacenter, latency in communications with a datacenter, compliance with a regulation, jurisdiction or region in which the computing task or a portion of the computing task is to be executed, the environmental impact related to executing of the computing task, and a type of energy source used for executing the computing task.

The supply computing strategy may include one or more of deciding between monetizing computing power or monetizing allocated energy to the datacenter according to an energy agreement, the type of computing resources for executing the computing task, the price of energy for executing the computing task, maximizing monetary revenues of the candidate datacenter, optimizing the expenses of the candidate datacenter, maximizing profits or profit margins for the candidate datacenter, the obligations mandated by an energy agreement between an energy source and the candidate datacenter, the availability of various energy generating sources to the candidate datacenter, maintaining or following a certain energy consumption profile over time for the candidate datacenter, the compliance of the computing task with a data policy, meeting financial goals of the candidate datacenter, and the environmental impact related to executing the computing task.

Maximizing the profits or profit margins for the candidate datacenter may include selecting one or more computing models from a plurality of computing models for hosting on the candidate datacenter, the one or more computing models producing higher profits or profit margins compared to other available computing models from the plurality of computing models.

Maximizing the profits or profit margins for the candidate datacenter may include prioritizing executing a first computing task over executing a second computing task where the first computing task produces higher profits or profit margins compared to the second computing task.

The task routing strategy may include one or more of selecting the candidate datacenter from the plurality of datacenters, changing the candidate datacenter from a first datacenter among the plurality of datacenters to a second datacenter among the plurality of datacenters, a certain time at which the computing task is scheduled for execution on the candidate datacenter, scheduling execution of the computing task on the candidate datacenter once a predetermined execution condition is met, splitting the computing task to a plurality of computing subtasks, and scheduling each subtask from the plurality of subtasks for execution on the candidate datacenter, selecting one or more computing models from a plurality of computing models for hosting and/or deployment on the candidate datacenter, stopping execution of an existing computing task on the candidate datacenter and executing the computing task, stopping execution of the computing task from the first datacenter and resuming execution of the computing task on the second datacenter, and modifying execution of the computing task by overclocking or underclocking computing hardware of the candidate datacenter.

The computing task may include deploying a computing model and splitting the computing task into a plurality of computing subtasks including a first subtask to host the computing model on the candidate datacenter and a second subtask to use the hosted computing model.

The second subtask may be further split into a third subtask to load the hosted computing model on a processor of the candidate datacenter and a fourth subtask to execute a process on the loaded computing model.

The computing task may include executing a computing process on a computing model that is hosted and loaded on the candidate datacenter.

The computing task may include executing a computing process on a computing model that is hosted on the candidate datacenter and splitting the computing task into a plurality of computing subtasks including a first subtask to stop executing an existing computing process on the computing model and a second subtask to execute the computing process on the computing model.

The computing task may include executing a computing process on a computing model that is not hosted on the candidate datacenter and splitting the computing task into a plurality of computing subtasks including a first subtask to cause unhosting an existing computing model from the candidate datacenter, a second subtask to host the computing model on the candidate datacenter, a third subtask to load the computing model on a processor of the candidate datacenter, and a fourth subtask to execute the computing process on the computing model.

The computing task may include deploying a computing model and splitting the computing task into a plurality of computing subtasks including a first subtask to load a container or virtual machine on the candidate datacenter, a second subtask to load the computing model in the container and/or virtual machine, and a third subtask to run the computing model.

The computing task may include deploying a computing model and splitting the computing task into a plurality of computing subtasks including a first subtask to load a first container or virtual machine on the candidate datacenter, a second subtask to load a second container or virtual machine in the first container or virtual machine, a third subtask to load the computing model in the second container or virtual machine, and a fourth subtask to run the computing model.

Stopping execution of the computing task may include a graceful stop including recording a last state and/or checkpoint related to the computing task.

Resuming the computing task may include recalling the recorded last state and/or checkpoint related to the computing task.

A system for managing a computing task requested by a client is provided. The system includes a controller including a communication circuit, a processor, and a memory having stored thereon computer-executable instructions that, when executed by the processor, cause the controller to receive, from a client device, the computing task and a demand computing strategy associated with the computing task, receive a plurality of supply computing specifications from a plurality of datacenters, at least one supply computing specification from the plurality of supply computing specifications corresponding to each datacenter from the plurality of datacenters. The supply computing specification at least includes deciding between monetizing computing power or avoiding energy consumption of the datacenter according to a compliance obligation, calculating a task routing strategy based at least on the demand computing strategy and a supply computing specification from the plurality of supply computing specifications, selecting a candidate datacenter from the plurality of datacenters at least based on the task scheduling strategy, and routing the computing task for execution on the candidate datacenter.

The client device may be a client terminal, a user interface, an application programming interface (API), or a programming terminal.

A method for managing computing task orchestration is provided. The method includes receiving, by a controller, an initial computing model from a client device, receiving, by the controller, from the client device, a first demand computing strategy regarding hosting the initial computing model, receiving, by the controller, from a plurality of datacenters, a set of supply computing specifications, at least one supply computing specification being related to a datacenter from the plurality of datacenters, selecting, by the controller, a candidate datacenter from the plurality of datacenters according to a predetermined rule, loading, by the controller, the initial computing model to the candidate datacenter for hosting, receiving, by the controller, a client request for performing a computing task using the initial computing model, with a second demand computing strategy, calculating, by the controller, a task routing strategy based at least on the second demand computing strategy and supply computing specifications of the candidate datacenter, determining, by the controller, whether the computing task is executable by the candidate datacenter according to the task scheduling strategy, routing, by the controller, the computing task for execution on the candidate datacenter according to the task routing strategy, if the computing task is executable by the candidate datacenter according to the task routing strategy, otherwise, selecting, by the controller, a backup datacenter from the plurality of datacenters according to the predetermined rule, and loading, by the controller, the initial computing model and the computing task to the backup datacenter for hosting and execution according to the task routing strategy.

The client device may be a client terminal, a user interface, an application programming interface (API), or a programming terminal.

The backup datacenter may be selected based on a preferred datacenter selected by the client.

The backup datacenter may be selected based on a preferred datacenter selected by the candidate datacenter.

The predetermined rule may include a supply computing strategy that matches with the first demand computing strategy.

The predetermined rule may include optimizing a fitness function including the supply computing strategy.

Other aspects and features will become apparent to those ordinarily skilled in the art upon review of the following description of specific disclosed embodiments in conjunction with the accompanying figures.

BRIEF DESCRIPTION OF THE DRAWINGS

In the following, embodiments of the present disclosure will be described with reference to the appended drawings. However, various embodiments of the present disclosure are not limited to the arrangements shown in the drawings.

FIGS. 4A and 4B are flowcharts depicting blocks of code for directing the processor circuit of FIG. 2 to control a computing task orchestration by the system shown in FIG. 1, according to an embodiment;

FIG. 6 is a schematic diagram showing layers of software programs on the computing servers of FIG. 1, according to an embodiment.

DETAILED DESCRIPTION

Figure 1:
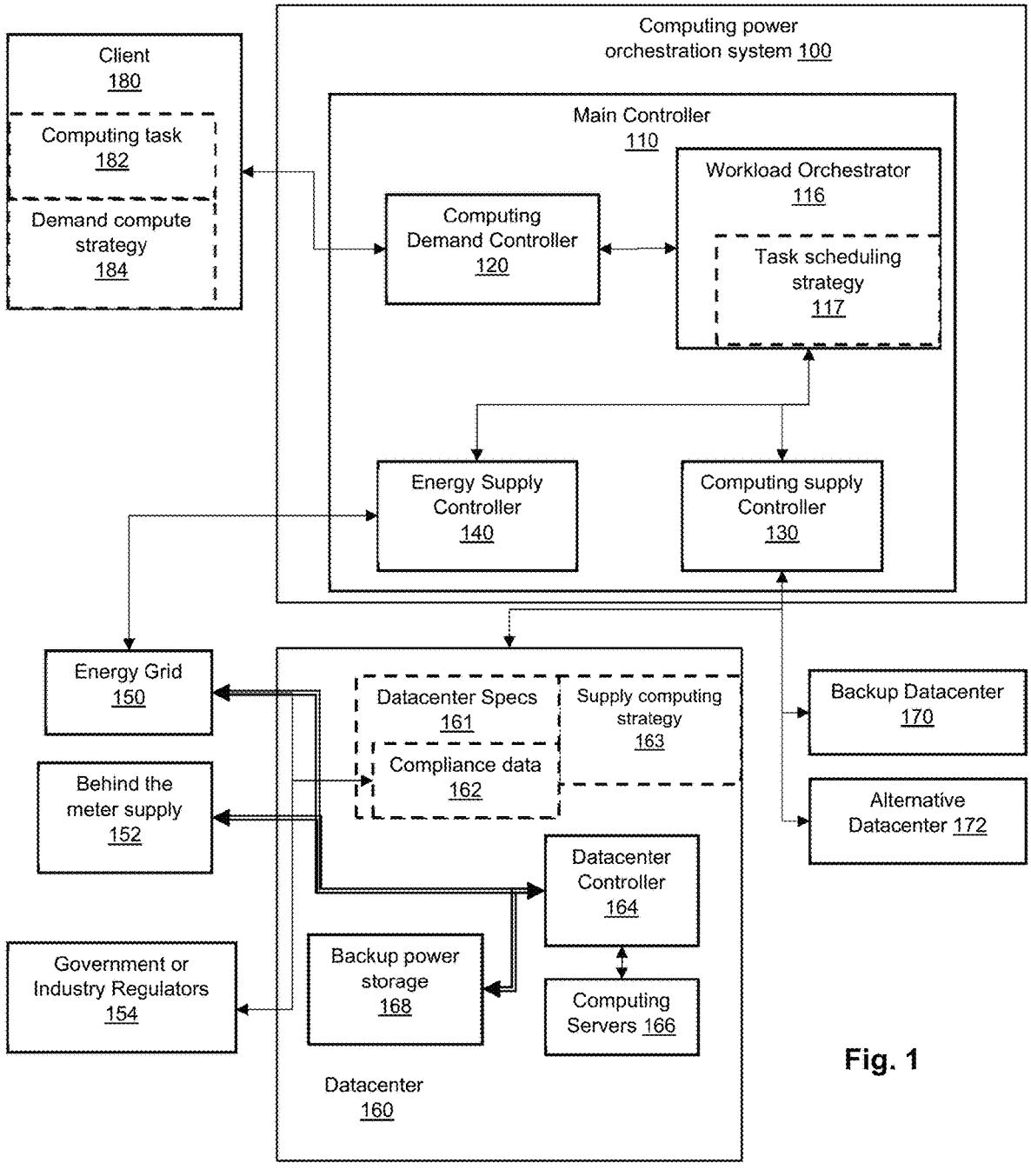
FIG. 1 is a schematic diagram showing a computing power orchestration system, according to an embodiment.

Computing power refers to the capability to perform or conduct computation or a computing task such as data processing (including but not limited to data ingestion, data cleaning, data transformation, data encryption, data decryption, data validation, data analysis, and data visualization), hosting, developing and training computing models (including but not limited to data models, simulation models, mathematical models, artificial intelligence models, neural network models, and large language models), tuning computing models, deploying and using computing models, parallel computing processes, running simulations such as Monte Carlo simulations, graphical simulations and rendering, audio processing and cryptocurrency mining processes.

Computing models or computational models may refer to data, simulation, physics, mathematical, neural network, protein folding, and/or forecasting models that use computer programs and data to simulate and study complex systems using mathematics, physics, and computer science. A computing model includes numerous variables that characterize the system being studied.

In some embodiments disclosed herein, one or more computing models may be packaged in containers (e.g., using Docker) and virtual machines (VM), among other methods. Containers are an abstraction at the software application layer that package code and dependencies together. Multiple containers may run on the same machine and share the operating system kernel with other containers, each running as isolated processes in a user space. Typically, containers take up less space than VMs and are able to handle more applications and use fewer VMs and operating systems. Virtual machines are an abstraction of physical hardware turning one server into many servers. A hypervisor may allow multiple VMs to run on a single physical machine. Each VM includes a full copy of an operating system, the application, and necessary binaries and libraries, typically taking up tens of GBs. VMs may, however, be slow to load. A combination of containers and VMs together may advantageously provide significant flexibility in hosting, deploying, and running computing models.

Compliance obligations may refer to both contractual agreements, such as energy agreements defined and exemplified hereinbelow, and government or industry regulations, such as data privacy and environment, social, governance (ESG) regulations.

Load shaping refers to deliberate management and adjustment of the power consumption profile of a datacenter over time. Datacenters may, for example, use load shaping to reduce peak power demands, take advantage of low energy prices or avoid times of high prices, enhance energy efficiency, and potentially participate in demand response programs and ancillary services related to a power grid.

Sending or commissioning instructions or commands to a datacenter may refer to sending instructions to a controller of the datacenter, a computing server in the datacenter, and/or a computing device (e.g. graphics processing unit (GPU), central processing unit (CPU), application-specific integrated circuit (ASIC) device, cryptocurrency mining device) of the datacenter. The instructions or commands may include high-level strategies (e.g., follow a power consumption target directive, prioritize environmental impacts over cost savings), may include detailed tasks (e.g., shut down all or a certain percentage of computing devices, adjusting computing hardware resources dedicated to a certain computing task, or specific computing task such as training an AI model or allocating workload to cryptocurrency mining devices), or may be a combination thereof.

The environmental impact may include environmental impacts related to sourcing energy and electricity, such as greenhouse gas emissions produced by fossil fuel generators. The energy sourcing impacts may be related to all types of energy sources including power grid, behind the meter sources, and backup power sources. The environmental impacts may further include computing impacts that are environmental impacts that are caused due to operating or performing computational processes in a datacenter, such as greenhouse gas emissions from cooling refrigerants in the datacenters or excessive heat generated by the computing devices.

Throughout this application, "datacenter" may refer to a large network of computing servers and computing devices configured for execution of computing tasks such as storage, processing, and distribution of data. Throughout this application, "datacenter" may also refer to a single computing server or computing device of a datacenter. Throughout this application, "datacenter" may also refer to one or more batches of computing servers or computing devices of a datacenter.

Referring to FIG. 1, a schematic diagram of an energy-intelligent computing power orchestration system is generally shown at 100, according to an embodiment. The computing power orchestration system 100 may be implemented by a computer server or a node in a cloud computing environment. The system 100 functions to manage the execution of computing tasks received from a client 180. The computing power orchestration system 100 is configured to match demand with supply in the context of computational tasks and while considering energy consumption for performing computational tasks. The computing power orchestration system 100 may be part of a cloud computing service, a distributed computing project, or a similar platform where tasks are processed across multiple data centers. The computing power orchestration system 100 includes a main controller 110 configured to receive a request, from a client 180, for performing a computing task 182. Along with the computing task 182, the main controller 110 receives a demand computing strategy 184 from the client 180 which corresponds to the computing task 182 and generally indicates the factors, constraints, and conditions (e.g., optimal energy consumption, or limited $CO_2$ emissions) under which the computing task is preferred to be performed. The computing task 182 and the demand computing strategy 184 may be received from the client 180 using a client terminal or a user interface 300 (shown in FIG. 3) provided by the computing power orchestration system 100, or the main controller 110 in particular. In an embodiment, the computing task 182 and the demand computing strategy 184 are configured to be sent separately from one or more user interfaces, application programming interfaces (API), and programing terminals. In another embodiment, the computing task 182 and the demand computing strategy 184 are configured to be sent together, for example, by providing the demand computing strategy 184 as a parameter associated with the computing task 182.

In an embodiment, the demand computing strategy 184 is defined by the client 180 at a previous time and a new demand computing strategy is not defined. Thus, it may be the case that the client 180 only defines the computing task 182 and further uses an existing or a pre-defined demand computing strategy 184.

In some embodiments, such as the embodiment shown in FIG. 1, the computing power orchestration system 100 may further include a computing demand controller 120, directly in communication with the client 180, and configured to receive and manage the computing task 182 and the demand computing strategy 184.

The main controller 110 is further configured to schedule the computing task 182, according to the corresponding demand computing strategy 184, for execution on a candidate datacenter among a plurality of datacenters 160, 170, and 172 which are in communication with the computing power orchestration system 100. The controller 110 may choose the candidate datacenter (for example the datacenter 160) such that the computing task 182 can be executed with the constraints defined in the demand computing strategy 184.

The main controller 110 is further configured to receive data about the plurality of datacenters 160, 170, and 172. The data received from the plurality of datacenters may include datacenter specifications and parameters 161 (such as information related to the cost of computing power, energy mix, availability of the whole datacenter or the amount of available computing capacity of the datacenter, communication latency of the datacenter, compliance data 162 of the datacenter, indicators related to the environmental impacts of the datacenter, computing resources and computing servers 166, such as GPUs, CPUs, hard drives, and memory storage available at the datacenter) and a supply computing strategy 163 (such as criteria determining how and when computation tasks are to be executed in the datacenter, such as the datacenter load shaping, return on investment of the datacenter, environmental impacts) provided by each datacenter 160, 170, 172. Each supply computing strategy 163 may include criteria based on which the datacenter 160, 170, 172 is strategizing to optimize its operation for performing a computing task such as the computing task 182. The compliance data 162 may include regulatory and compliance obligations of the datacenter, which may refer to contractual agreements of the datacenter 160, such as energy agreements, and/or to compliance with regulations and standards prescribed by government or industry regulators 154, such as data privacy and environment, social, governance (ESG) regulations. The energy agreements may include agreements with an energy supplier such as an operator of an energy grid 150 or a qualified scheduling entity (QSE) related to the energy grid 150. In this disclosure, the datacenter specifications and parameters 161 may also be interchangeably referred to as supply computing specifications, supply computing parameters, or supply computing specifications and parameters.

Each of the datacenters 160, 170, and 172 include computing servers 166 including hardware such as memories, data storage units, and processors including CPU, GPU, application specific integrated circuit (ASIC), field-programmable gate array (FPGA), and cloud computers. The computing servers 166 may include a single server of processors, a cluster of servers, multiple servers controlled by a central controlling server, or multiple slave servers supporting a master server, among other configurations of the computing servers 166. The computing servers 166 are configured to perform various computing tasks or computational processes.

The datacenter 160 further includes a datacenter controller 164 configured to manage communications between the data center 160 and the computing power orchestration system 100. The datacenter controller 164 communicates the datacenter specifications 161 and the supply computing strategy 163 of the datacenter 160 to the main controller 110 (or the compute supply controller 130 of the main controller 110), or may receive a computing task, such as the client computing task 182 or computing tasks related to deploying and executing the client computing task 182, along with a strategy (e.g., task scheduling strategy 117) to execute the computing task 182, from the computing power orchestration system 100. The received computing tasks may include hosting, training, loading or using a computing model, such as a machine learning model, and the received task scheduling strategy may include the desired cost of executing the computing task, the availability or redundancy of the computing servers 166, the desired amount of greenhouse gas (GHG) emissions as a result of executing the computing task, and/or the desired regulatory or compliance obligations and considerations related to the computing task.

The datacenter controller 164 may further be configured to manage various resources (e.g., hardware and software computing resources and energy resources) in the datacenter 160, particularly with the aim to manage the overall demand or supply computing strategies (e.g., managing energy consumption) for the datacenter 160 in performing computational tasks. The energy consumption of the datacenter 160 may be controlled by the datacenter controller 164 in several ways, including by adjusting the amount and type of energy sourced to the candidate datacenter (e.g., less than 10 MW·h per day consumption, avoid energy sourcing during peak hours, adjusting energy sourcing based on real-time renewable energy mixture in the grid); adjusting the amount of computing tasks (i.e., computing workload) allocated to the datacenter 160 for execution; adjusting computing hardware configuration of the datacenter 160 (e.g., overclocking or underclocking CPU or GPU processors in computing servers of the datacenter 160); and adjusting the amount of computing capacity dedicated to a computing task (e.g., allocating only 25% of the overall computing power of the datacenter 160 to the computing task and reserving the rest for other future or scheduled tasks or keeping such tasks in idle).

Moreover, the power consumption of the datacenter 160 may be controlled by distributing or allocating the received computing tasks to a suitable computing server from the computing servers 166, or by managing power supplied to the computing servers, or by locally managing workload on the computing servers 166 according to the supply computing strategy 163. The datacenter controller 164 may control or adjust computing resource allocation, power, and workload of the computing servers 166 at an individual level (i.e., for each individual computing server of the computing servers 166) or in bulk (e.g., a batch of computing servers in the computing servers 166).

The datacenter controller 164 may be a local controller or a remote controller, for example implemented in a cloud computer.

In an embodiment, the datacenter 160 does not include a datacenter controller 164 and communications to and from the computing power orchestration system 100 may be transmitted from and to the computing servers 166 directly.

The datacenter 160 executes computational tasks by sourcing energy from an energy grid 150, from behind-the-meter (BTM) supply 152 sources, or from sources within the premises of the datacenter such as a backup power storage 168 unit. The energy grid 150 may be understood as an electric utility or a power company in the electric power industry that engages in electricity generation and distribution of electricity for sale generally in a regulated market. The Energy Grid 150 may further include grid regulators or operators such as ERCOT, CAISO, and NYISO in the United States of America or AESO and IESO in Canada. It should be understood that the Energy Grid 150 may further include or refer to an operator of the energy grid, an energy generation station, or a local control station.

Behind-the-meter (BTM) supply 152 includes energy or power from a power generation system, such as, but not restricted to, a wind or solar power system, where energy sourcing occurs before the generated electricity undergoes a step-up transformation to convert it into high-voltage AC power for transmission to the energy grid 150. Thus, BTM supply 152 may include electricity directly sourced from an intermittent power generation system, such as a wind farm or solar array, rather than relying on the main energy grid

150. The BTM supply 152 may be remote to the datacenter 160 or may be co-located and within the premises of the datacenter 160.

The backup power storage 168 may include uninterrupted power supply (UPS) systems, flywheels or power banks which include backup batteries that store energy for times when energy from primary energy sources is interrupted.

The datacenter 160 may have an energy agreement with one or more authorities managing the energy grid 150, the BTM supply 152, or any other external service providers administering energy sourcing to the datacenter 160. The energy agreement may include power blocks purchased from the energy grid 150, a power purchase agreement (PPA) between the datacenter 160 and BTM supply 152, a virtual PPA (VPPA), an energy hedge agreement with a non-energy grid counterparty to manage the financial risk in energy cost fluctuations, or incentive program agreements such as ancillary services and demand response program agreements, introduced by energy grid authorities, for example, to support the frequency regulation, voltage regulation and balancing supply and demand in the energy grid 150 network.

Moreover, the energy agreement may include programs that allow the datacenter 160 to flow excess energy generated from a co-located BTM supply 152 or backup power storage 168 to the energy grid 150 for a benefit such as monetary incentives.

Through any of these energy agreements, the datacenter 160 may be incentivized or have the option to stop consuming energy, to sell back energy to the energy grid 150, to sell excess energy to the energy grid 150, to sell the option to purchase or use energy to the energy grid 150 or another interested entity, to cut energy consumption during certain time periods, or to commit to consume certain amount of energy in certain times. A skilled person in the art may be familiar with various types of energy agreements that may exist between an energy grid 150 and a datacenter 160.

The energy agreement may be an energy option agreement, i.e., an agreement between the energy grid 150 and the datacenter 160 associated with the delivery of energy to the datacenter 160. As part of a power option agreement, the datacenter (or the datacenter operator, contracting agent for the datacenter, or semi-automated or automated control system associated with the datacenter-such as the datacenter controller 164) provides the energy grid 150 with the right, but not obligation, to reduce the amount of energy delivered to the datacenter 160 up to an agreed amount of energy during an agreed upon time interval. In order to provide the energy grid 150 with this option, the datacenter needs to be using at least the amount of energy subjected to the option (e.g., a minimum energy threshold). For instance, the datacenter may agree to use at least 1 MW of energy from the energy grid at all times during a specified 24-hour time interval to provide the energy grid 150 with the option of being able to reduce the amount of energy delivered to the load by any amount up to 1 MW at any point during the specified 24-hour time interval. The datacenter 160 may grant the energy grid 150 this option in exchange for a monetary consideration such as receiving energy at a reduced price and/or monetary payments if the option is exercised by the energy grid 150.

The power option agreement may provide a sequence of minimum energy limits over different periods of time.

The power option agreement may provide maximum power consumption targets to which the datacenter is committed to stay below.

Figure 4A:
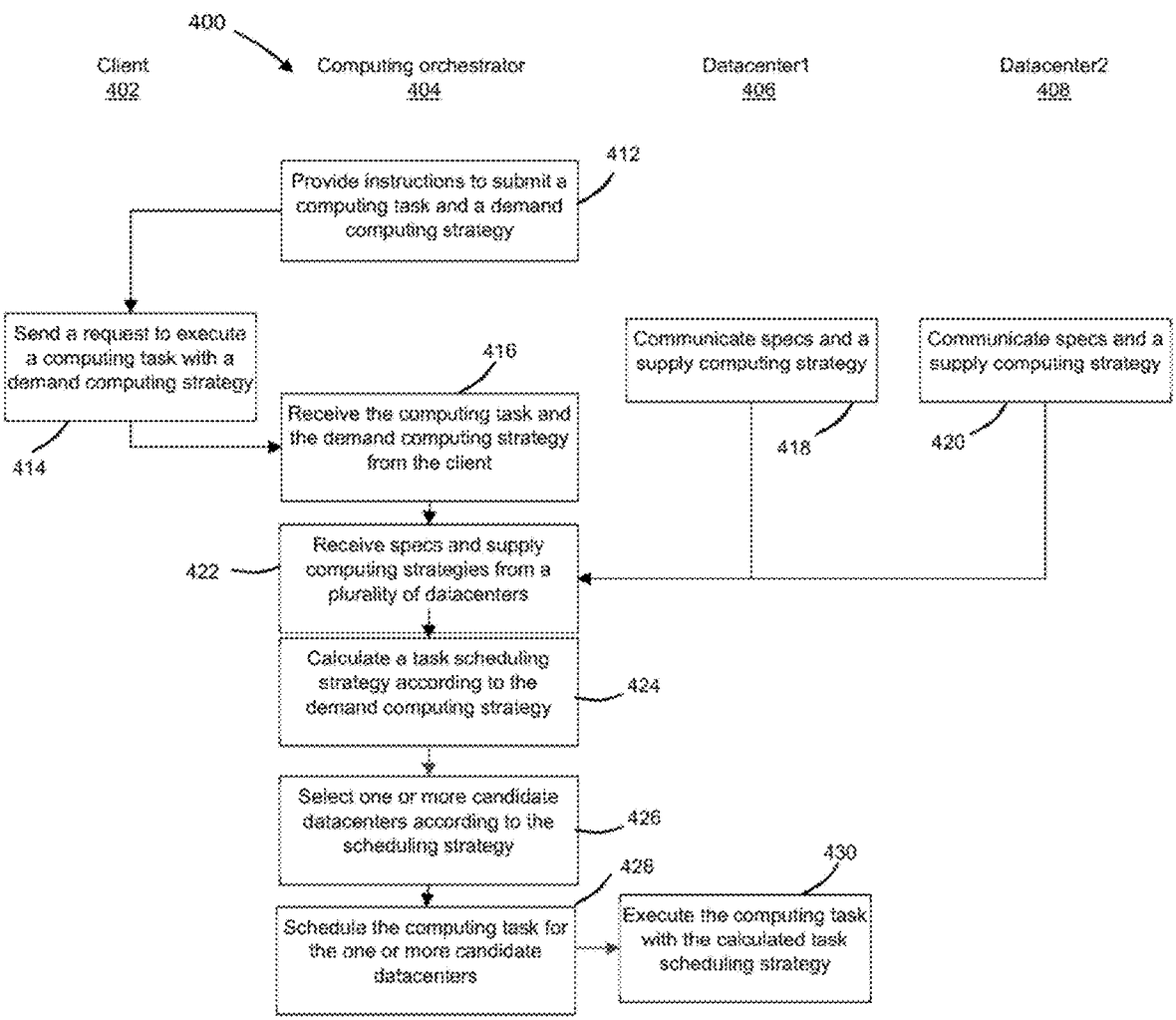

The above-mentioned energy agreements may be a key factor in the supply computing strategy 163 and the decision-making of the datacenter 160 on when and how to consume energy to reduce the energy cost of computing power to the datacenter as well as to end clients 180. The energy agreements may be leveraged manually by a manager of the datacenter 160, but in this disclosure methods are further presented (for example as illustrated in FIGS. 4A and 4B) to streamline and automate the decision-making by a computer process. The energy agreement may be loaded on the datacenter controller 164 and communicated with the main controller 110.

In general, the supply computing strategy 163 may include a target power consumption for the datacenter 160. The target power consumption may be derived or prescribed from the above-mentioned energy agreements (which may be derived either as a mandatory directive or as an optional directive) or may be derived from other factors such as overall cost (energy cost, operational costs, and overall computing cost) and environmental impacts of the datacenter 160. In other words, the target power consumption may be provided as an input to the supply computing strategy 163 or may be calculated by the supply computing strategy 163. As mentioned above, the target power consumption may include minimum and maximum power thresholds to which the energy consumption profile of the datacenter 160 is bound. The minimum and maximum power thresholds may vary over time in a stepwise manner or dynamic manner (with continuous change over time). The target power consumption may include a range (including both a minimum and a maximum) rather than a minimum or a maximum. Over some periods of time, there may be no power consumption target, whether mandatory or optional, and the datacenter 160 may have a degree of freedom in consuming unbounded energy and depending upon its computing demand. In an embodiment, the minimum power threshold may be zero.

The supply computing strategy 163 may further include additional key factors that are important for the datacenter 160 when deciding on the execution of computing tasks. In some embodiments, the supply computing strategy 163 includes optimizing a fitness function with one or more of the supply computing specifications and parameters 161 including but not limited to: cost of energy consumption (for deployment (hosting and execution), idle); the type of computing resources (e.g., GPUs, CPUs) to be used for preparation and executing computing tasks; energy agreements (such as PPAs, energy hedges, and participation in ancillary services and demand response programs); compliance with regulatory obligations (such as obligations regarding environmental, social, governance, and energy availability mandates); reducing environmental impacts (such as reducing GHG emission footprints); availability of energy sources (e.g. availability of BTM 152 and/or backup power storage 168); preference to execute computing tasks in certain dates or certain periods of a day; load shaping (i.e., particular load level over time, for example, maintain a minimum energy consumption profile during certain time intervals, or having a certain level of uptime); recovery of capital costs in building, developing, or operating the datacenter 160 (e.g., return on investment for the costs associated with setting up the datacenter 160 or the computing servers 166, in a particular time frame); and increasing revenues captured by the datacenter 160 (e.g., by deciding to selling computing power versus taking advantage of incentives in the energy agreements, for example, load curtailments, energy hedges, or selling energy back to the energy grid 150). The supply computing strategy 163 may include optimizing or maximizing profits or profit margins for the datacenter 160. Optimizing the profits or profit margins may include considering all of the above-mentioned supply computing specifications and parameters of the datacenter 160 to calculate or estimate the net revenue and the net expenses of the datacenter 160 and thereby calculating the net profits, for example.

The backup datacenter 170 and the alternative datacenter 172 may include one or more datacenters similar to the datacenter 160 with similar components, structure, and functionality. The backup datacenter 170 may be a datacenter determined by the datacenter 160 as a backup in scenarios when the datacenter 160 is not operational, for example, and it is preferred to defer executing a computing task to a predetermined backup datacenter such as the backup datacenter 170. The alternative datacenter 172 may be a datacenter that is selected by the computing power orchestration system 100, as an alternative to the datacenter 160, in case the datacenter 160 is not the candidate datacenter to execute the computing task 182.

The computing power orchestration system 100 further includes an energy supply controller 140 in communication with the energy grid 150 and configured to receive information regarding energy price, updates regarding the energy sources 150 and 152 (e.g., interruptions, announcements, notifications, price fluctuations, new incentive programs, and details about existing programs such as ancillary services or demand response programs) and energy agreements related to the energy grid 150 and the BTM supply 152.

The computing power orchestration system 100 further includes a workload orchestrator 116 configured to receive information and data from the client 180 (including the computing task 182 and the demand computing strategy 184), and the plurality of datacenters 160, 170 and 172, and determine a task scheduling strategy 117. The task scheduling strategy 117 may determine a strategy or criteria to select a candidate datacenter among the plurality of datacenters 160, 170, 172, and a temporal schedule to execute the computing task 182. For example, according to one embodiment, the task scheduling strategy 117 may indicate selecting a candidate datacenter with a supply computing strategy 163 that matches or is aligned with the demand computing strategy 184 of the client 180 and may determine when the execution of the computing task 182 is to be started and when is the deadline for complete execution of the computing task. In an embodiment, the main controller 110 includes a computing supply controller 130 that is operably in communication with the plurality of datacenters 160, 170, 172 and is configured to at least receive the supply computing strategy 163 and/or transmit to them the computing tasks 182 along with the task scheduling strategy 117.

In one embodiment, the workload orchestrator 116 determines to transmit the computing task 182 immediately to the candidate datacenter and command the datacenter to immediately, or at a later time in the future, execute the computing task 182, or alternatively may break the computing task 182 into multiple subtasks and schedule each subtask for execution in a certain timeline. The time for executing the computing task 182 may be determined (either immediately or future execution time) immediately or may be determined in the future.

The task scheduling strategy 117 may include scheduling computing tasks in the future with future conditions, such as all strategy factors in the demand and supply computing strategies 184 and 163.

Voltage provided by the energy grid 150 and/or the BTM supply 152 may drop or fluctuate and thereby result in the shutdown of the whole or a portion of the computing servers 166. Normally, this shutdown may take a considerable amount of time to recover, which may result in significant energy consumption levels by a data center and hence load drops on the energy source. The supply computing strategy 163 may include a voltage ride-through strategy whereby a voltage drop in the energy source 150 or 152 may be detected and monitored by the datacenter (e.g., in the datacenter controller 164) and accordingly the datacenter 160 (or the datacenter controller 164) may choose to adjust and schedule computing tasks for the computing servers 166 to quickly bring the energy consumption levels to normal and prevent amplified load drops in the energy sources 150 and 152. The task scheduling strategy 117 may include the voltage ride-through strategy and the voltage drop in the energy sources 150 and 152 may be detected by the energy supply controller 140 in the computing power orchestration system 100, and the workload orchestrator 116 may schedule the transmitted computing tasks to the datacenter 160 accordingly to avoid amplified load drops on the energy sources.

It should be noted that, at the main controller 110 or the datacenter 160, when calculating the overall cost for computing the datacenter 160, the overall cost can include a computing cost and an energy cost, among other costs such as administrative costs including service agreement costs, client onboarding costs, and costs related to allocating human and capital resources for the period of executing a computing task. The computing costs may further include equipment costs (such as hardware CPU, GPU, and memory cost and operating system or software cost to operate the hardware), equipment depreciation cost, and equipment maintenance costs. Moreover, the energy cost may further include the price for power distributed through regional and national electric power grids and may comprise generation, administration, and transmission & distribution ("T&D") costs.

Figure 2:
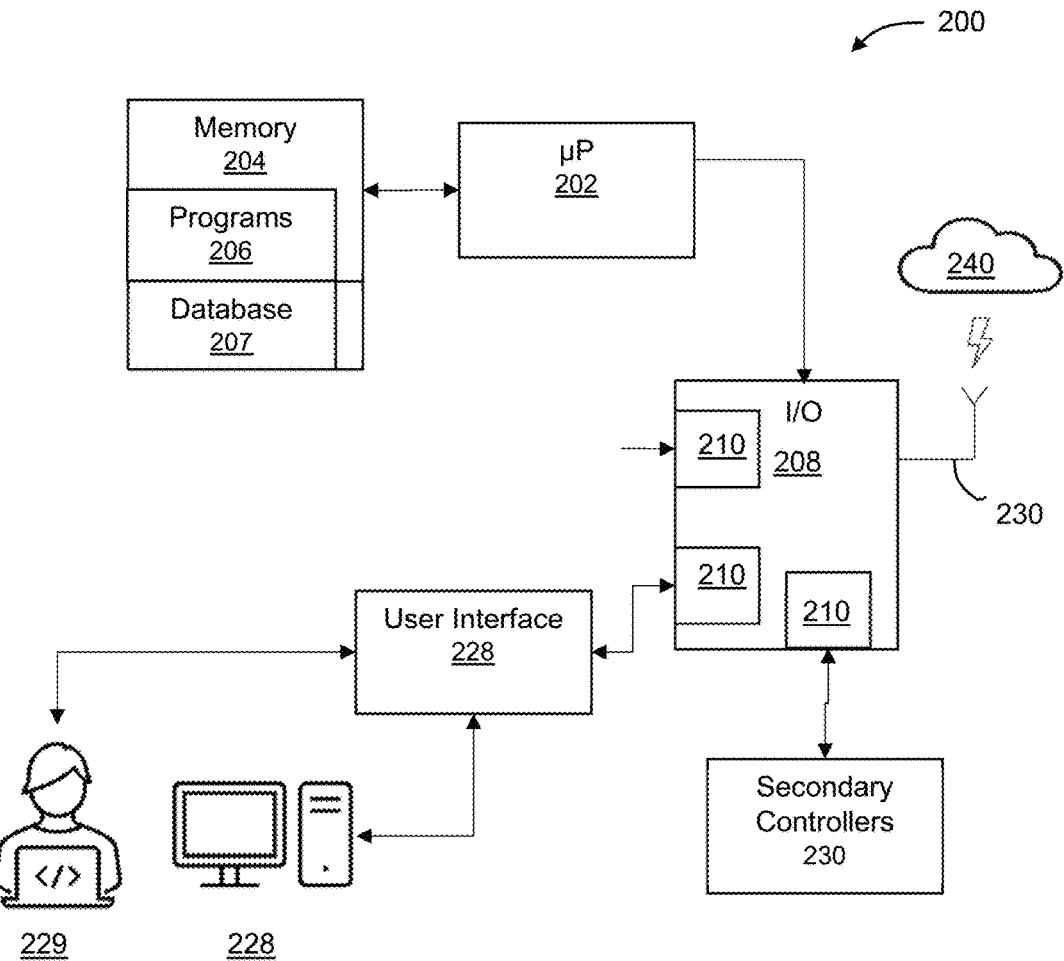
FIG. 2 is a block diagram of a processor circuit for implementing the main controller of the computing power orchestration system of FIG. 1, according to an embodiment.

Referring now to FIG. 2, shown therein is a processor circuit or controller 200 for implementing the main controller 110 of the computing power orchestration system 100, according to an embodiment. It will be appreciated that the controller 200 may implement other components of a computing power orchestration system. The controller 200 may be implemented using an embedded processor circuit such as a Linux-operated computer. The controller 200 includes a microprocessor 202, a memory 204, and an input output (I/O) 208, all of which are in communication with the microprocessor 202. The I/O 208 includes a wireless interface 230 (such as an IEEE 802.11 interface) for wirelessly receiving and transmitting data communication signals between the controller 200 and a network 240. The I/O 208 further includes a wired network interface 210 (such as an Ethernet interface) for connecting to a secondary controller 230. Where the controller 200 implements the main controller 110, the secondary controller 230 may be an implementation of the datacenter controller 164 or computing demand controller 120, which is connected to the main controller 110. The I/O 208 may further be in communications with a user interface 228 which facilitates interactions between the controller 200 and a user 229.

Figure 3:
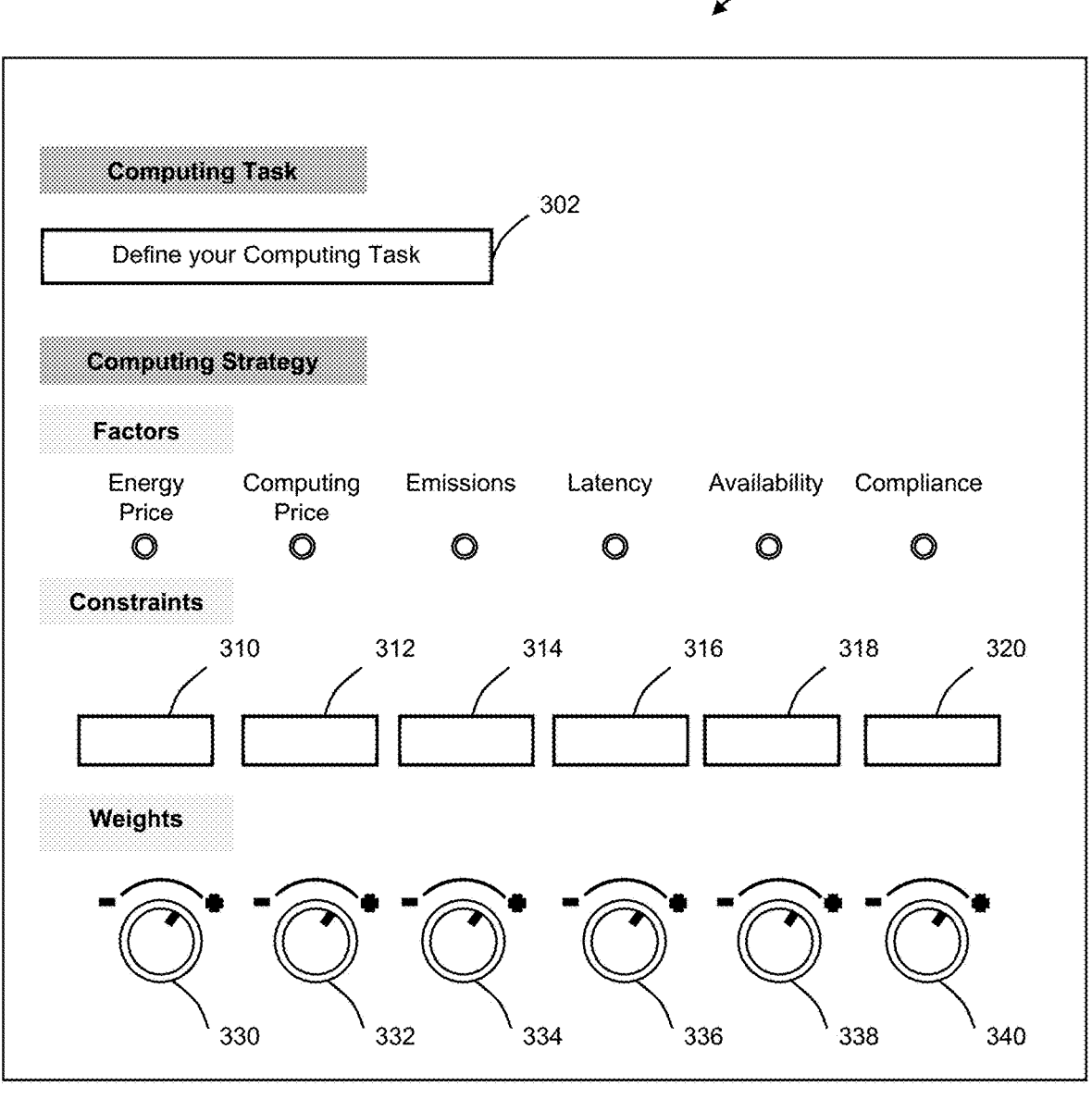
FIG. 3 is a graphical user interface depicting an implementation of a user interface of FIG. 1.

Referring now to FIG. 3, a graphical user interface depicting an implementation of the user interface 228 is generally shown at 300. The graphical user interface shown in FIG. 3 represents a user interface that receives inputs from the client 180 requesting performing a computing task. The user interface 300 includes fields to receive the computing task 182 from the client 180 as well as the associated demand computing strategy 184 from the client 180. The field 302 may be used by the client 180 to define or upload the computing task 182. In an embodiment, the field 302 is connected to a programming terminal to enable the client 180 to use a programming language to define the computing task 182. In another embodiment, the field 302 includes a native prompt window to allow a low-code definition of the computing task 182 by the client 180. The computing task defined by the client 180 may include the broadest definition for a computing task and may include a request for training, fine-tuning, and/or deploying (e.g., hosting, loading, and executing for use) a computing model such as an artificial intelligence model.

The user interface 300 includes a plurality of factors such as energy price (energy consumed for executing the computing task 182), computing price, environmental impacts such as direct or indirect GHG emissions produced due to executing the computing task 182, latency in communication with the datacenter executing the computing task, availability of the datacenter executing the computing task, the amount of available capacity of the datacenter, and compliance with certain regulations such as data privacy, data security, or data hosting guidelines such as the EU general data protection regulation (GDPR), the US health insurance portability and accountability act (HIPAA), the service organization control type 2 (SOC2) requirements, and payment card industry (PCI) guidelines, that are to be met by the datacenter executing the computing task 182. The factors may further include processing performance of computing servers of the datacenter such as processing speed of the computing servers (e.g., token rate of a large language model to a logical or mathematical prompt).

The user interface 300 further includes fields 310 to 320 corresponding to each of the factors mentioned above that receive an input constraint value from the client 180 associated with each of the factors. For example, in field 310, max and/or min values related to the energy price desired by the client 180 are determined. As another example, in field 320, the desired geographical location and/or data policy guidelines of the datacenter hosting or executing the computing task 182 are determined by the client 180. The further fields 312, 314, 316, and 318 are activated for receiving an input from the client 180, only when the corresponding factor is selected by the client 180. It will be appreciated by one of skill in the art that any number of such fields may be provided in the user interface 300 and that the six fields 310, 312, 314, 316, 318, and 320 shown are merely exemplary.

The user interface further includes fields 330 to 340, each corresponding to each of the factors mentioned above and configured to receive an input weight value from the client 180, each weight value indicating the importance of each factor. For example, each of the fields 330 to 340 may be knob-like controls, allowing the client 180 to indicate a minimum and a maximum value, for example between 0 to 1. For example, the field 330 may be set to a value of 0.9 by the client 180 to indicate a high importance for the energy price factor in the demand computing strategy 184.

The fields provided in the user interface 300 advantageously allow the client 180 to adjust and set their demand computing strategy 184 but further guide the client 180 through the adjustment and selection of the demand computing strategy 184 by providing the client 180 with a list of factors to choose from and further providing the client 180 with the ability to select a constraint and weight for each of the selected factors. In an embodiment, the user interface 300 further allows the client 180 to define their own factors to further define the demand computing strategy 184.

The demand computing strategy 184 may be determined using the interface 300 in a fully customizable manner by selecting one or more important factors from a list of provided factors as well as by determining a constraint and weight related to each selected factor.

Figure 5:
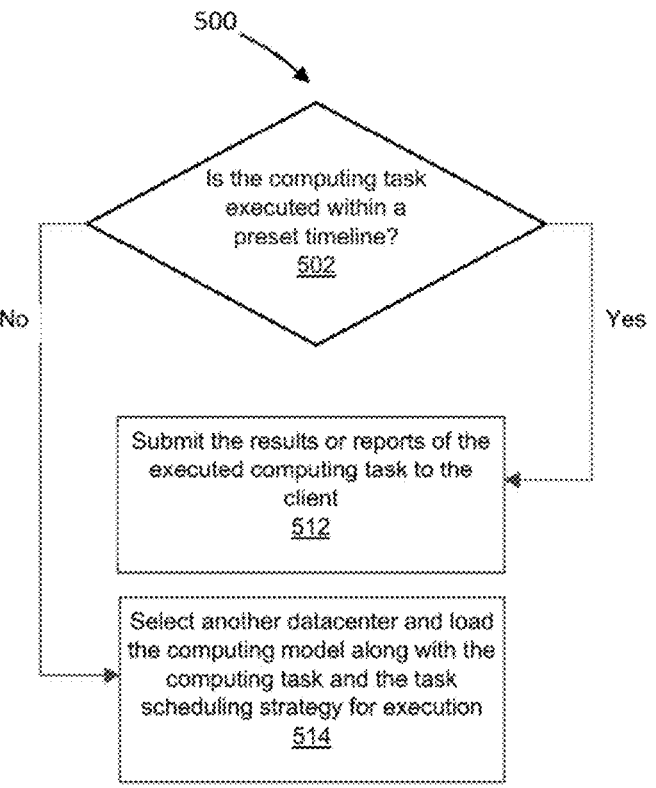
FIG. 5 is a flowchart depicting blocks of code for directing the processor circuit of FIG. 2 to control a computing task orchestration by the system shown in FIG. 1, according to an embodiment.

Referring to FIGS. 4A, 4B, and 5, flowcharts 400, 440, and 500, respectively, are shown depicting blocks of code for directing the processor circuit 200 of FIG. 2 to control a computing task orchestration by the system 100 of FIG. 1, according to an embodiment. The flowcharts 400, 440, 500 generally outline systematic approaches for executing the computing task 182, starting from a request of the client 180 and culminating in the execution of the task 182 within a selected datacenter, such as the datacenter 160. The computing power orchestration process 400 may be implemented on the control circuit 200. Each block may represent a specific function or module in a software system, possibly running on the microprocessor 202, designed to automate the process for determining a task scheduling strategy and implementing such task scheduling strategy with the goal to improve efficiency in executing the computing task 182 while considering the demand computing strategy 184, the supply computing strategy 163, and the optimal use of energy and computing resources. In FIGS. 4A and 4B, a client 402, a computing orchestrator 404, and a datacenter1 406, may represent the client 180, the computing power orchestration system 100, and the datacenter 160 of FIG. 1, respectively. The datacenter1 406 may include more than one datacenter and for example, may include the backup datacenter 170 as well. datacenter2 408 may represent the alternative datacenter 172 of FIG. 1. Each block of code related to the compute orchestrator 404 may be implemented in the main controller 110 or in a suitable controller under the main controller 110 (e.g., the workload controller 116, the computing demand controller 120, the computing supply controller 130, and the energy supply controller 140). Each block related to the datacenter1 406 and the datacenter2 408 may be implemented in the datacenter controller 164 or in the computing servers 166.

Referring to FIG. 4A in particular, a flowchart depicting blocks of code or instructions for directing a computing power orchestration process by the computing power orchestration system 100, is generally shown at 400. The computing power orchestration process 400 outlines a systematic approach to executing the computing task 182, starting from the request of the client 180 and culminating in the execution of the task 182 within a selected datacenter such as the datacenter 160. The computing power orchestration process 400 may be implemented on the control circuit 200. Each block may represent a specific function or module in a software system, possibly running on the microprocessor 202, designed to automate the process for determining a task scheduling strategy and implementing such task scheduling strategy with the goal to improve efficiency in executing the computing task 182 while considering the demand computing strategy 184, the supply computing strategy 163, and the optimal use of energy and computing resources.

The computing power orchestration process 400 starts at block 412 by the computing orchestrator 404 providing instructions for the client 402 to submit a computing task and a demand computing strategy. The instructions provided at this block may be represented in the user interface 300, for example, and guide the client 402 for submitting their desired computing task.

At block 414 the client 402 submits a request to the computing orchestrator 404, to execute a computing task along with an associated demand computing strategy. This indicates that the client has defined a computing task along with a particular strategy as to priority, timing, and resources, as exemplified in the embodiments discussed with respect to FIG. 3.

At block 416, the computing task and the demand computing strategy are received by the computing orchestrator, from the client.

At blocks 418 and 420, datacenter1 406 and datacenter2 408, representing a plurality of datacenters, communicate their specifications and supply computing strategies with the computing orchestrator 404.

At block 422, the computing orchestrator 404 receives the specifications and the supply computing strategies from the plurality of datacenters. As discussed hereinabove, the datacenter specifications may include information related to the cost of computing power, energy mix, availability of the datacenter, communication latency of the datacenter, and computing resources such as GPUs and CPUs, at the datacenter. The supply computing strategy may include criteria for determining how and when computation tasks are to be executed in the datacenter, such as the datacenter load shaping, return on investment of the datacenter, and environmental impacts.

At block 424, a task scheduling strategy is calculated by the computing orchestrator 404. The task scheduling strategy may determine a strategy or criteria to select a candidate datacenter among the plurality of datacenters and a temporal schedule to execute the computing task defined by the client 402 given the demand computing strategy. The calculation of the task scheduling strategy may include complex decision-making algorithms to find an optimized fit between the demand computing strategy from the client 402 and a supply computing strategy from a datacenter among the plurality of datacenters 406, 408. Calculating the task scheduling strategy may include solving an optimization problem defined by the following objective functions:

$$f\_obj = f(\text{demand computing strategy}) - f\_i(\text{supply computing strategy})$$

where f(demand computing strategy) represents the demand computing strategy by the client 402 and may be defined by factors, adjustable weights, and constraints determined by the client 180 as part of the demand computing strategy 184. The f_i(supply computing strategy) represents the supply computing strategy by the $i^{th}$ datacenter from the plurality of datacenters. f_i(supply computing strategy) may be an inherently dynamic function that changes with time. The optimization problem may find one or more datacenters and times for executing the computing tasks at the one or more datacenter, for which the f_obj is minimized. Calculating the task scheduling strategy may further optimize the supply computing strategy (i.e., f_i(supply computing strategy)) as well, by adjusting the supply computing specifications or parameters defining the supply computing strategy as discussed with respect to FIG. 1. The task scheduling strategy may include calculating a computing cost per unit (e.g., time or computing task volume indicated by a token) or the overall computing cost for executing the given computing task. This computing cost per unit or the overall computing cost may be relayed to the client 402 for potential verification or confirmation by the client.

In an embodiment, the supply computing strategy is to maximize the net profits, profits, or profit margins of the $i^{th}$ datacenter. In one example, the task scheduling strategy may suggest or instruct the i$^{th}$ datacenter to host one or more computing models that may cause higher profits for the i$^{th}$ datacenter. For example, if a large language model (LLM), a cryptocurrency mining model (CMM), and an object perception model (OPM) for an autonomous vehicle are requested to be hosted and computing tasks are to be conducted thereon. If the i$^{th}$ datacenter is only able to host 2 of the computing models (e.g., due to limitations of GPU or memory capacity), and if the LLM and CMM produce higher profit margins for the i$^{th}$ datacenter, the task scheduling strategy may suggest or instruct the i$^{th}$ datacenter to host only the LLM and CMM. In this example, the task scheduling strategy may further instruct the i$^{th}$ datacenter to prioritize loading the LLM on a processor of the i$^{th}$ datacenter and executing computing tasks on the loaded LLM, in times when the execution of computing tasks on the LLM generates higher profit margins, and the i$^{th}$ datacenter may be instructed to load the CMM and execute on the loaded CMM otherwise. In the same example, in cases when the object perception model for an autonomous vehicle produces higher profit margins, the i$^{th}$ datacenter may be instructed to unhost the LLM and CMM and host and load the OPM for execution of related computing tasks.

In another example, the task scheduling strategy may suggest or instruct the i$^{th}$ datacenter to cancel or stop executing a first computing task and start executing a second computing task due to higher profits associated with executing the second computing task compared to the first computing task. The second computing task may be a computing task executed on a computing model that is identical or substantially similar to the computing model on which the first computing task is executed, or may be a different computing model.

Referring to FIG. 6 now, shown therein is a schematic diagram showing layers of software programs on the computing servers 166 of FIG. 1. FIG. 6 further presents an architecture for deploying computing models on the computing servers 166. The computing servers 166 include a host operating system 610 such as a Linux or windows operating system. A local computing task orchestration agent program 620 is running on the host operating system 610 to locally manage or implement computing tasks and compute scheduling strategies, such as the computing tasks and their scheduling strategy instructed by the task scheduling strategy 117 or the supply computing strategy 163. The local computing task orchestration agent 620 may be a VM or container that causes loading and running one or more computing models (such as an LLM or CCM). Alternatively, the local computing task orchestration agent 620 may cause the host operating system 610 to load and run a computing model on an independent container or VM 630, in which case the local computing task orchestration agent 620 may cause downloading or installing the independent container or VM 630 on the host operating system 610, which may initially cause more time and processing load on the computing servers 166 compared to loading and running it on the agent 620, but may cause more efficient task allocation and processing in the long run. The local computing task orchestration agent 620 may be a VM or container that loads and runs sub-VMs or sub-containers to load and run computing models. For example, the local computing task orchestration agent 610 may load and run a computing marketplace on subcontainer-1 642, a language model on a subcontainer-2 644, and a cryptocurrency model on a subcontainer-3 646. The computing marketplace running on the subcontainer-1 642 may include software and programs (which may be, or may include, third-party software) that decide on loading and running other subcontainers within the subcontainer-1 642 (such as subcontainer-1.1 652 and subcontainer-1.2 654), based on a task scheduling strategy (such as the task scheduling strategy 117) to, for example, maximize profits for the datacenter that includes the computing servers 166. The compute marketplacing may be in communication with a 3$^{rd}$ party remote server that has access to various computing models such as LLMs and CCMs, and depending on the supply computing strategy 163 (e.g., maximizing profits for the datacenter), may deploy (e.g. host, load, and run on the subcontainer-1 642) the most suitable computing models to the computing servers 166 to implement the supply computing strategy 163 or the task scheduling strategy 117.

According to one embodiment, the computing servers 166 of the i$^{th}$ datacenter host the subcontainer-1 642 to the subcontainer-3 646 but only have access to limited computing models included therein (e.g., due to limitations of GPU, CPU, or memory capacity). The task scheduling strategy 117 may suggest or instruct the local computing task orchestration agent 620 to prioritize (e.g., due to higher profitability) loading the subcontainer-2 644 and executing computing tasks on language models when there are user-defined computing tasks 182 related to language models. In this example, in times when there are no user-requested computing tasks 182 related to high-profit-margin language models, the task scheduling strategy 117 may further instruct the computing task orchestration agent 620 to prioritize loading the subcontainer-1 642 for deploying high-profit-margin computing models in the computing marketplace (and subsequently deploying the subcontainer-1.1 652 and the subcontainer-1.2 654) or running the subcontainer-3 646 for deploying cryptocurrency models, depending on respective profitability.

In an embodiment, the local computing task orchestration agent 620 includes similar functionalities to the datacenter controller 164 of the datacenter 160, for example functionalities such as managing resources (e.g., distributing or allocating one or more received computing tasks to a suitable computing server or host), managing power supplied to the computing servers 166, and/or locally managing workload on the computing servers 166 according to the supply computing strategy 163.

In an embodiment, the datacenter controller 164 is implemented and embodied in the local computing task orchestration agent 620 of the computing servers 166.

Referring back to FIG. 4A, at block 426, based on the calculated scheduling strategy in the previous block 424, one or more suitable datacenters are selected by the computing orchestrator 404 to handle execution of the computing task.

At block 428, the computing orchestrator 404 schedules the computing task for execution at the one or more candidate datacenters. The scheduling takes into account the timing, resources, and any other specifics to be provided to the computing task and the demand computing strategy, as well as information to be provided to the supply computing strategy at the one or more candidate datacenters. The scheduled computing task is communicated with the one or more candidate datacenters and is executed by a datacenter at block 430.

Referring to FIG. 4B now, another embodiment of a computing power orchestration process is depicted generally by the flowchart 440. Similar to the process 400, the process 440 depicts blocks of code or instructions implemented on the control circuit 200 and the microprocessor 202 in particular, to automate the process for determining a task scheduling strategy and implementing the task scheduling strategy with the goal to improve efficiency in executing the computing task 182 of the client 180 while considering the demand computing strategy 184, the supply computing strategy 163, and the optimal use of energy and computing resources. According to the embodiment shown in FIG. 4B, the flowchart 440 considers a scenario where the computing task includes executing a task on a computing model, and where hosting the computing model on a datacenter is a separate action item from executing a task on the computing model.

The computing power orchestration process 440 starts at block 450 where the client 402 submits a request to the computing orchestrator 404, to set up a computing model along with a first demand computing strategy. This indicates that the client 402 has defined the computing model, such as a machine learning or a simulation model, along with the first demand computing strategy. The computing model and first demand computing strategy may be defined and submitted to the computing orchestrator 404 using a user interface similar to the user interface 300.

At block 452, the computing model and the first demand computing strategy are received by the computing orchestrator 404, from the client 402.

At blocks 454 and 456, datacenter1 406 and datacenter2 408, respectively representing a plurality of datacenters, communicate their specifications and supply computing strategies with the computing orchestrator 404.

At block 458, the computing orchestrator 404 receives the specifications and the supply computing strategies from the plurality of datacenters.

At block 460, the computing orchestrator 404 selects one or more candidate datacenters from the plurality of datacenters according to a predetermined rule. The predetermined rule may be similar to the task scheduling strategy discussed with respect to FIG. 4A and based on the first demand computing strategy and the supply computing strategies. The predetermined rule may further be based on a datacenter's computing model hosting capacity, which may be different from the datacenter's computing processing capacity. The computing orchestrator 404 may select more than one datacenter since, typically, the cost of hosting a computing model is not significant and is relatively lower than the cost of executing a task on the computing model. Additionally, the redundancy provided by hosting a computing model on multiple datacenters may be advantageous in some scenarios. Selecting more than one datacenter for hosting the computing model may be decided by the computing orchestrator 404 according to the predetermined rule (e.g., due to improved reliability or redundancy) or may be dictated by the client 402 for improved redundancy and availability, for example.

At block 462, the computing orchestrator 404 commands hosting the computing model on the selected one or more datacenters.

At block 464, the computing model is hosted on the one or more datacenters.

At block 466, the client 402 requests executing a computing task, using the hosted computing model, along with a second demand computing strategy. The requested execution and the second demand computing strategy may be defined in a user interface similar to the user interface 300.

At block 468, the computing orchestrator 404 receives the request from block 466. The computing orchestrator 404 may also check a credit balance related to the client 402 indicating the amount of credit the client 402 has with the computing orchestrator 404 to use the services of the computing orchestrator 404. If the credit balance of the client is not sufficient for executing the computing task, the computing orchestrator 404 may communicate back to the client 402 with a notification of insufficient credit and a request for adding to the credit balance.

At block 470, the computing orchestrator 404 calculates a task scheduling strategy for scheduling the requested execution on the hosted computing model. The calculation of the task scheduling strategy may be similar to the calculation of the task scheduling strategy discussed under FIG. 4A. The task scheduling strategy may take into account the timing, resources, and any other specifics to be provided to the computing task and the second demand computing strategy, as well as information to be provided to the supply computing strategy at the one or more candidate datacenters where the computing model is hosted. The task scheduling strategy may include calculating a computing cost per unit (e.g., time or computing task volume indicated by a token) or the overall computing cost for executing the given computing task. Such computing cost per unit or the overall computing cost may be relayed to the client 402 for potential verification or confirmation.

In an embodiment, the supply computing strategy is to maximize the net profits, profits, or profit margins of the $i^{th}$ datacenter. The task scheduling strategy may suggest or instruct the $i^{th}$ datacenter to cancel or stop executing a first computing task and start executing a second computing task due to higher profits associated with executing the second computing task compared to the first computing task. The second computing task may be a computing tasks executed on a computing model that is identical or similar to the computing model on which the first computing task is executing, or may be a different computing model.

At block 472, the compute orchestrator 404 assesses the execution feasibility of the scheduled computing task, determined by the task scheduling strategy of block 470, at the one or more candidate datacenters where the computing model is hosted. The assessment may be performed by a controller of the computing orchestrator 404, such as the main controller 110 (or its subcontrollers such as the workload orchestrator 116 or the computing supply controller 130), or may be assessed in a controller in the one or more candidate datacenters, such as the datacenter controller 164. If the scheduled computing task is determined as feasible on at least one datacenter from the one or more candidate datacenters, at block 474, the computing task will be scheduled for loading, according to the task scheduling strategy, on the at least one datacenter from the one or more candidate datacenters. The loaded computing task may include loading the hosted computing model in the one or more candidate datacenters (i.e., the computing model is hosted locally in the one or more candidate datacenters) and performing a computing process on the hosted and loaded computing model. In a scenario where the computing model is hosted in a remote datacenter, the computing model may be downloaded from the remote datacenter and loaded on the one or more candidate datacenters for execution of the computing task.

At block 476, the computing task is executed on the at least one datacenter according to the calculated task scheduling strategy.

If the scheduled computing task is determined as not feasible on any of the candidate datacenters, at block 478, an alternative datacenter is selected by the computing orchestrator 404 for hosting the computing model according to the first demand computing strategy and executing the computing task according to the second demand computing strategy. Where the compute orchestrator 404 is not able to find and select a candidate datacenter, the alternative datacenter may be a default datacenter determined by the client 402 or by the computing orchestrator 404.

At block 480, the alternative datacenter hosts the computing model and executes the scheduled computing task according to the task scheduling strategy.

At any point after the block 468, the computing orchestrator 404 may relay to the client 402 an estimate of the time and the computation workload that may be desirable for executing the computing task. The estimations may be determined by the candidate datacenter or may be calculated by the computing orchestrator 404.

Referring to FIG. 5, blocks of code representing a verification process 500 for directing the processor circuit 200 of FIG. 2 to control a computing task orchestration by the system 100 shown in FIG. 1 are shown, according to an embodiment. The verification process is performed by the computing orchestrator 404 during or after execution of a computing task. The verification process 500 may be a follow-on process to the computing power orchestration process 440 and similarly depicts blocks of code or instructions implemented on the control circuit 200 and the microprocessor 202 in particular, to automate the process for operating the computing orchestrator with the goal to improve efficiency in executing the computing task 182 of the client 180 while considering the demand computing strategy 184, the supply computing strategy 163, and the optimal use of energy and computing resources.

The verification process 500 starts at block 502 by assessing whether execution of the computing task is completed in the candidate datacenter within a predetermined timeline (e.g., 1 hour, 1 day) depending on the type of the computing task.

At block 512, if the execution is completed, the results or reports of executing the computing task are submitted to the client 402.

Otherwise, in block 514, if the execution is not completed within the predetermined timeline, an alternative datacenter is selected, similar to block 478, for hosting the computing model and executing the computing task.

As pointed out under FIG. 4A, the calculated task scheduling strategy by the compute orchestrator 404 may suggest or instruct a datacenter (e.g., datacenter1 406) to cancel or stop executing a first computing task and start executing a second computing task, for example, due to higher profits associated with executing the second computing task compared to the first computing task. The second computing task may be a computing task executed on a computing model that is identical or substantially similar to the computing model on which the first computing task is executing, or may be a different computing model.

According to an embodiment, the stop instructions regarding a computing task include a graceful or soft stop in which a last state and a checkpoint for the computing task are recorded by the computing servers 166, the main controller 110, or the datacenter controller 164, or a combination thereof. For example, if the computing servers 166 are training an artificial intelligence (AI) model while a graceful or soft stop instruction is dispatched to the datacenter 160, the computing devices 166 may record the latest state of the AI training (e.g., the number of epochs, the values for the trained AI model weights, or a number of training datasets used up to the stop time) and establish a checkpoint on the latest training dataset used for training the AI model. The recorded last state or checkpoint may be used by the computing servers 166 of the datacenter to resume the computing task (e.g., training the AI model) at a later time, once the computing servers 166 are instructed to start or resume the computing task.

In yet another embodiment, the calculated task scheduling strategy by the compute orchestrator 404 suggests or instruct a soft or graceful stop execution of the computing task (e.g., training an AI model) at a first datacenter (e.g., Datacenter1 406) and further instruct a second datacenter (e.g., the Datacenter2 408) to resume executing the computing task, for example where the second datacenter is more aligned with the client's demand computing strategy 184 or because the second datacenter is more optimized toward executing the scheduling strategy 117. In such cases, the recorded last state and the checkpoint are further recorded in a central server or memory (e.g., the main controller 110) and are further communicated to the second datacenter so that the computing servers of the second datacenter can resume the computing task (training the same AI model) from where the computing task was stopped at the first datacenter.

In further embodiments, the task scheduling strategy includes further attributes for the graceful stop instructions. For example, the task scheduling strategy 117 may select a deadline for the first datacenter to execute the soft stop. For example, the instructed soft stop may include requesting the first datacenter to gracefully stop operations within 10 minutes after receiving the graceful stop instruction, or otherwise a hard stop (no checkpoint or last state recordation) may be pursued. The task scheduling strategy 117 may further instruct the first datacenter with a frequency for a periodic recordation of the last state and the checkpoint during execution of the first computing task.

In further embodiments, the calculated task scheduling strategy 117, performed by the computing orchestrator 404, includes instructing a datacenter to slow down (e.g., by clocking down or underclocking the computing servers 166 of the datacenter) or speed up (e.g., by overclocking the computing servers 166) a computing task, in order to optimize profits or optimize alignment with the demand computing strategy 184.

More generally, the calculated task scheduling strategy 117, to be performed by the computing orchestrator 404, may include instructing a datacenter (or its computing servers) to:

start or resume a computing task by turning on a computing device from shutdown, starting a VM or container, waking up a computing device from hibernation or standby, or by starting or resuming sending computational tasks (i.e., a computing workload) for the computing servers 166;

stop executing the computing task by shutting down or hibernating a computing device, shutting down or hibernating a VM or container, stopping the flow of computing tasks (i.e., workload) to the computing servers 166, a soft stop (with recorded last state and/or checkpoint), or a hard stop; and adjust execution of the computing task by overclocking or underclocking the processing hardware (e.g., GPU, CPU), adjusting the flow of computing tasks (i.e., workload) to the datacenter, or adjusting allocated computing resources to a VM or container.

In an embodiment, the workload orchestrator 116 calculates a task scheduling strategy 117 that follows target power consumption levels. As disclosed hereinabove, the target power consumption may include directives from energy agreements and thus, the task scheduling strategy 117 may schedule workload in a way to meet the target power consumption levels. In one example, the task scheduling strategy 117 may instruct the datacenter 160 to perform a computing task or workload (such as training an AI model) to increase the power consumption of the datacenter 160 above a minimum threshold, which is the target power consumption. The instructions for performing the instructed computing task may include a predetermined period of time for executing the computing task (e.g., starting and/or stopping the computing task at a certain time or a duration for performing the task), or may include an undetermined period of time (e.g., perform until a next instruction is commissioned). According to another example, the task scheduling strategy 117 may instruct the datacenter 160 to stop or pause performing a computing task or skip performing a scheduled task to decrease the datacenter 160 power consumption below a maximum threshold. According to another example, the task scheduling strategy 117 may instruct the datacenter 160 to modify performing a computing task (e.g., adjust allocated computational resources or amount of computing tasks) to decrease or increase the datacenter 160 power consumption to reach or follow the target power consumption levels over various periods of time.

In one embodiment, the task scheduling strategy 117 includes a hybrid workload orchestration (i.e., including scheduling 2 or more types of computing loads, for example, using AI models, training AI models, and cryptocurrency mining) to meet or follow the target power consumption. Each type of workload in the hybrid workload may include or use distinct resources (power and computational) and power consumption profiles. The hybrid workload may be performed on a single computing device (e.g., one computer), may be performed across multiple devices in one datacenter, or even across multiple datacenters (e.g., one datacenter provides one type of workload, and another datacenter provides another type of workload). In one example, the task scheduling strategy 117 may instruct a computing server of the datacenter 160 to execute incoming computing tasks 182 from one or more clients 180 related to using an AI model (e.g., a large language model). If the requested computing tasks include or use datacenter power consumptions lower than desired target power consumption levels, the workload orchestrator 116 may instruct the datacenter 160 to further train an AI model (which usually includes or uses dedicated servers with GPUs, and higher levels of energy consumption over longer periods of time) that had been scheduled for running (and may be requested by a different client), in order to increase the datacenter power consumption levels. If the datacenter power consumption levels are still below the desired target power consumption levels, the workload orchestrator 116 may further allocate and send workload to a certain number of cryptocurrency miners (e.g., including specialized ASICs and FPGA hardware units) in the datacenter for processing, in order to meet the desired target power consumption determined for the datacenter by the workload orchestrator 116. The workload orchestrator 116 may further take into account dynamic power consumption of cooling systems that the computing servers and hardware are to use.

In an embodiment, the workload orchestrator 116 communicates the high-level task scheduling strategy 117 (i.e., instructs various workloads to meet or follow a target power consumption, without providing detailed instructions on what type of workloads and which timings) to the datacenter controller 164, and the datacenter controller 164 processes and determines what workloads and at which timing are to be allocated to the computing servers and devices, and further sends instructions or allocates workloads accordingly. In another embodiment, the workload orchestrator 116 is directly in communication with the computing servers and devices, and the workload orchestrator 116 processes and determines the type of workload and the timing for executing the workloads and further commissions the workloads for execution to the computing servers and devices. Furthermore, in still another embodiment, the type of workloads and their timings are processed and determined in the workload orchestrator 116, the datacenter controller 164, or a combination thereof. For example, in the above-mentioned example, using an AI model and its timing as well as allocating and sending workloads to the miners may be directly communicated to the computing server and miners by the workload orchestrator 116, while the timing for training the AI model may be processed, determined, and instructed to the computing devices by the datacenter controller 164.

The workload orchestrator 116 determines the level of hybrid workload mix based on each task's distinct power consumption and compute resource allocation requirements, to eventually meet a target load shaping effort.

Figure 7:
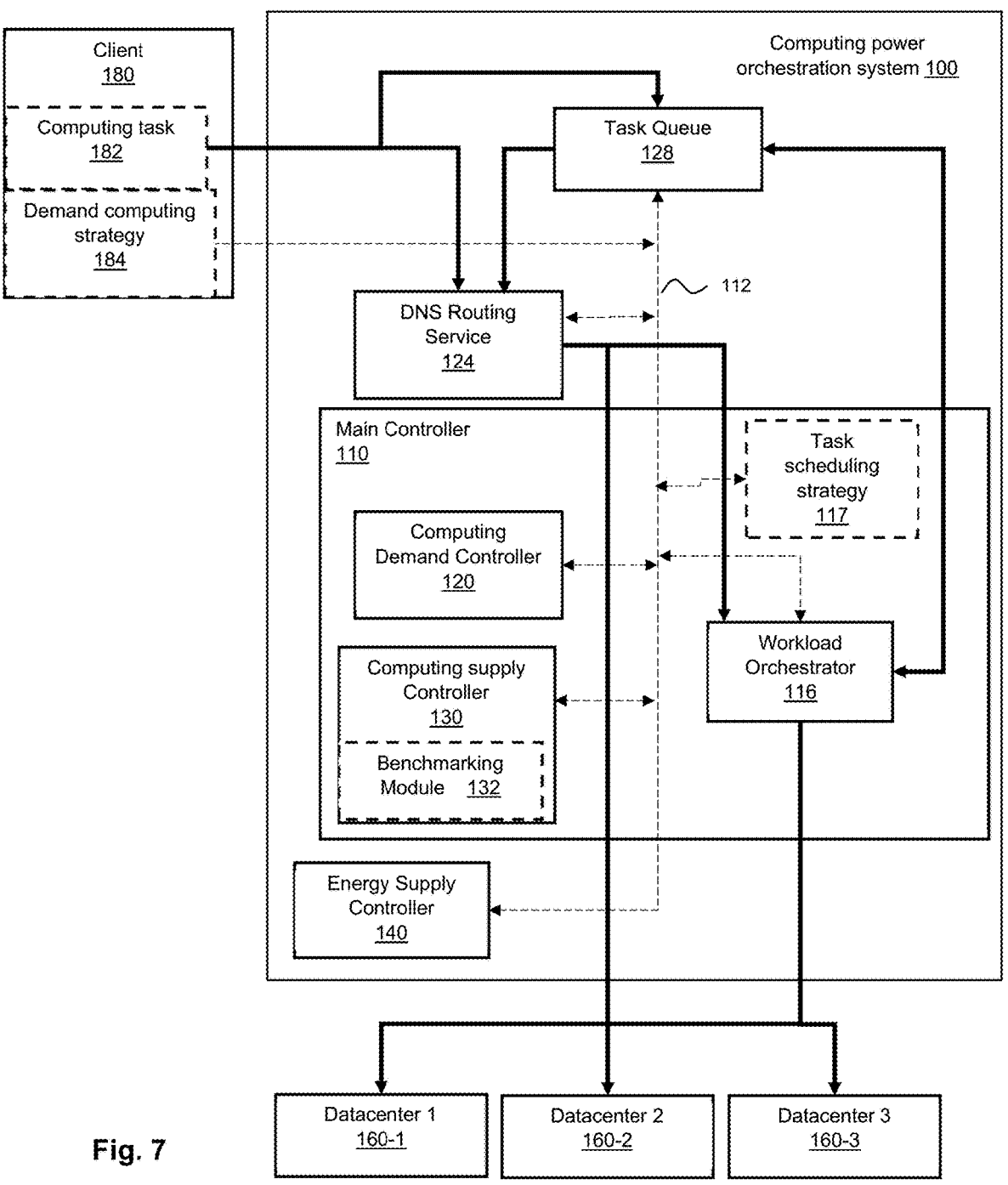
FIG. 7 is a schematic diagram showing a computing power orchestration system, according to another embodiment.

Now referring to FIG. 7, shown therein is a schematic diagram of a computing power orchestration system 100, according to another embodiment.

In FIG. 7, the communication or transaction of computing tasks are shown by solid lines while other types of data such as strategy, strategy parameters, specifications, rules, and decision data are shown by dashed lines. FIG. 7 illustrates another embodiment of the system 100 orchestrating a computing task 182 from a client 180 for execution by a datacenter such as datacenters 1 to 3 160-1 to 160-3 or their respective computing servers and/or devices. The computing power orchestration system 100 includes a DNS Routing service 124 (also may be referred to as a content distribution network (CDN), a DNS management module, a global traffic manager (GTM), or load balancer) configured to route the computing task 180 to a candidate datacenter 160-1 to 160-3. Once the computing task 182 is received at the system 100, the DNS routing service 124 is configured to quickly pass the computing task 182 to a suitable datacenter, according to a DNS routing strategy, without the task 182 being passed through the workload orchestrator 116. Tasks which need more advanced workload management and scheduling (e.g., tasks that include model selection), may be passed on to the workload orchestrator 116 by the DNS routing service 124, and then are routed to the candidate datacenter by the workload orchestrator 116.

The DNS routing service 124 may have various routing strategies for allocating an incoming computing task to a datacenter or a computing server. The routing strategies may be, at least in part, determined by the demand computing strategy 184 determined by the client 180 which is passed on to a data hub 112 of the system 100. The demand computing strategy 184 may be communicated directly to the DNS routing service 124 through the data hub 112 or may be first transferred to the computing demand controller 120 and then communicated to the DNS routing service 124 through the data hub 112 after being translated to routing strategies and optional modifications by the computing demand controller 120. For example, if the client's demand computing strategy includes performing the computing task 182 on a sustainable datacenter with minimal carbon emissions, the DNS routing service 124 may quickly pass on the computing task 182 to the datacenter matching with this strategy, where the routing strategy has been received at the DNS routing service 124 from the data hub, directly from the client 180 or after being processed at the computing demand controller 120.

Additionally, the routing strategies may be determined or influenced by other factors such as energy price, geolocation, or performance of datacenters, which may be determined by the computing supply controller 130 or the energy supply controller 140. For instance, the DNS management module 124 may evenly distribute or route a series of upcoming tasks among datacenter 1 160-1 through datacenter 3 160-3. Alternatively, the DNS management module 124 may route tasks to the datacenter with the most economical energy consumption or geographically closest to the client 180 based on IP address, or prioritize datacenter 1 (160-1) as the primary destination and, if the datacenter 1 (160-1) becomes overloaded or unresponsive, the DNS routing service 124 may redirect tasks to datacenter 2 (160-2), and subsequently to other datacenters as desired.

The DNS routing service 124 may route tasks based on a strict, all-or-nothing manner (binary logic) or based on weighted or probabilistic factors (fuzzy logic), allowing for a more nuanced allocation. A binary logic may route tasks to computing servers or datacenters without partial or weighted allocations and uses clear-cut thresholds, rules or thresholds. In an embodiment employing binary logic, the DNS routing service 124 routes all tasks to a certain datacenter if a certain condition is met (e.g., datacenter load below a threshold). The fuzzy logic may route computing tasks to datacenters proportionally based on datacenter load, latency, or other demand and supply computing strategies, for example. In an embodiment employing fuzzy logic, 60% of tasks are routed to datacenter 1 160-1 and 40% to datacenter 2 160-2. These logics or strategies for task routing (whether binary or fuzzy) may be periodically refreshed or recalculated at fixed intervals or on-demand based on requests received from the client 180 (e.g., demand computing strategy 184) or conditions and strategies of the datacenters (e.g., from benchmarking module 132), for example.

In the embodiment shown in FIG. 7, the computing supply controller 130 is configured to provide status, specifications, computing supply strategy, and generally conditions of datacenters 1 to 3 160-1 to 160-3 and is not configured to transmit the computing task 182 to the datacenters (unlike the embodiment in FIG. 1). The computing supply controller 130 may further include a benchmarking module 132 configured to obtain information (e.g., datacenter performance and specifications 161 such as latency, capacity and computing speed related to a datacenter) about the datacenters 160-1 to 160-3. In an embodiment, the benchmarking module 132 collects benchmarking information about the datacenters from feedback of the executed computing tasks 182 on the datacenters, or alternatively the benchmarking module 132 commissions sending one or more test or standard tasks to the datacenters to benchmark the datacenters' performance for one or more types of tasks. The benchmarked information gathered at the benchmark module 132 is transmitted to the data hub 112 and communicated to the DNS routing service 124, the workload orchestrator 116, and/or the computing demand controller 120, for example. This allows for adjustments to the DNS routing strategy and the task scheduling strategy 117, if desired, by modifying the candidate datacenters and their priorities. These adjustments determine how the computing task 182 is routed by the DNS routing service 124 and the workload orchestrator 116.

The computing power orchestration system 100 may further include a task queue module 128, where deferrable tasks (e.g., tasks that are not time-sensitive) are queued to be allocated to proper datacenters and servers at the right time. When a computing task 182 is received at the system 100, a time sensitivity of the task may be associated with the task. For example, the client 180 may select (e.g., as part of their demand computing strategy 184) whether the computing task 182 is time-sensitive or deferrable. Alternatively, the client 180 may select whether the task is time-sensitive or not, or indicate a level of time sensitivity of the computing task. The system 100 may then determine the optimum route for the task 182 according to the selected time sensitivity by the client 180. Time-sensitive tasks may be routed to a server or datacenter immediately through the DNS routing service 124, while deferrable tasks may be queued in the task queue 128. The computing tasks queued in the task queue 128 may be routed to the DNS routing service 124 or the workload orchestrator 116 depending on the type of the task and the execution strategy associated with task. The task queue 128 may receive an execution strategy through the data hub 112, which can be calculated at the computing demand controller 120, computing supply controller 130, or the task scheduling strategy 117.

In an embodiment, the workload orchestrator 116 selects the candidate datacenter, where the computing task is being routed to, for each computing task or workload, whereas for the tasks that are being routed at the DNS routing service 124, the candidate datacenter is selected for a batch of computing tasks (e.g., for incoming tasks during a certain timeframe, from a certain geographical location, associated with a certain demand computing strategy).

The computing power orchestration system 100 may be used by various types or personas of client 180 and different types of computing tasks 182. The client 180 may be an owner of multiple datacenters or computing servers or devices in different locations and may be interested in managing task and workload scheduling and routing according to a certain static or dynamic strategy (e.g., routing tasks to the most sustainable datacenter, to the most cost-effective datacenter, to the fastest datacenter). In this scenario, the client 180 may be mainly interested in DNS-level routing as the computing servers or datacenters may have been optimized for each type of computing task 182. Accordingly, the computing tasks 182 may be server-dependent and a datacenter or computing server may be optimized for a task type (e.g., a computing server designated for tasks running on a certain AI model). In a similar scenario, the computing servers may not be optimized for a particular type of task and thus the computing task 182 may not be server-dependent, and thus routing the task at the workload orchestrator 116 (e.g., where a computing model may be loaded to a server) may be more advantageous. In another scenario, the client 180 may not own any datacenters or computing servers and may be interested in executing the computing task 182 on a third-party datacenter or server. In this scenario both DNS-level and workload orchestrator-level routing is advantageous.

While specific embodiments have been described and illustrated, such embodiments should be considered illustrative only and not as limiting the disclosed embodiments as construed in accordance with the accompanying claims.

The invention claimed is:

1. A system for managing a computing task requested by a client, the system comprising a controller comprising a communication circuit, a processor, and a memory having stored thereon computer-executable instructions that, when executed by the processor, cause the controller to:

receive, from a client device, an initial computing model;

receive, from the client device, a first demand computing strategy regarding hosting the initial computing model, the first demand computing strategy associated with the computing task, the first demand computing strategy indicating one or more factors selected by the client;

receive, from the client device, the computing task;

receive, from the client device, a second demand computing strategy associated with the computing task;

measure, by a benchmarking module, benchmarking information at a datacenter of a plurality of datacenters;

generate a plurality of supply computing specifications based on the benchmarking information, at least one supply computing specification from the plurality of supply computing specifications corresponding to the datacenter of the plurality of datacenters;

receive the plurality of supply computing specifications from the plurality of datacenters;

calculate a task routing strategy, to reduce an energy cost and a compute cost of the computing task, based at least on the second demand computing strategy, and a supply computing specification from the plurality of supply computing specifications;

select a candidate datacenter from the plurality of datacenters according to a predetermined rule for reducing the energy cost and the compute cost of the computing task;

load the initial computing model to the candidate datacenter for hosting, when the initial computing model is not hosted in the candidate datacenter;

receive, from the client device, a client request for performing the computing task using the initial computing model, with the second demand computing strategy;

determine whether the computing task is executable by the candidate datacenter according to the task routing strategy;

route the computing task for execution on the candidate datacenter according to the task routing strategy, when the computing task is executable by the candidate datacenter according to the task routing strategy;

otherwise, select a backup datacenter from the plurality of datacenters, for reducing the energy cost and the compute cost of the computing task, according to the predetermined rule; and load the initial computing model and the computing task to the backup datacenter for hosting and execution according to the task routing strategy.

2. The system of claim 1, wherein the client device is a client terminal, a user interface, an application programming interface (API), or a programming terminal.

3. The system of claim 1, wherein the system further causes the controller to present to the client device a set of factors including the one or more factors, the set of factors defining desired conditions related to executing the computing task, and wherein the controller receives, from the client device, the demand computing strategy indicating the one or more factors, from the set of factors, selected by the client, and a constraint and a weight related to a factor from the one or more selected factors.

4. The system of claim 1, wherein the task routing strategy includes a task scheduling strategy.

5. The system of claim 1, wherein the system further causes the controller to use a global traffic manager, wherein the global traffic manager is configured to receive the computing task and route the computing task to the candidate datacenter.

6. The system of claim 1, wherein the system further causes the controller to use a benchmarking module, the benchmarking module configured to measure the benchmarking information for the plurality of supply computing specifications from the plurality of datacenters.

7. The system of claim 1, wherein the supply computing specification further comprises a supply computing strategy.

8. The system of claim 1, wherein the controller generates commands to control an energy source of the candidate datacenter to execute the computing task.

9. The system of claim 8, wherein the energy source comprises one or more of:

an energy grid;

a behind-the-meter energy generation source; and a backup energy storage unit.

10. The system of claim 8, wherein the predetermined rule is based on one or more of:

the calculated task routing strategy;

a computing capacity of the datacenter from the plurality of datacenters;

information from the benchmarking module; and instructions received from the client.

11. The system of claim 1, wherein the candidate datacenter further comprises a local controller communicatively coupled to the controller, and wherein the controller sends a command to the local controller to perform load shaping by adjusting energy consumption of the candidate datacenter and automatically scheduling the computing task based on compliance obligations or monetization on energy resources allocated to the candidate datacenter according to an energy agreement.

12. The system of claim 11, wherein the command to the local controller to perform load shaping by adjusting the energy consumption is configured to meet or follow a target power consumption profile by the candidate datacenter.

13. The system of claim 11, wherein the command to the local controller to perform load shaping by adjusting the energy consumption comprises one or more of:

adjusting the amount of energy sourced to the candidate datacenter;

adjusting the amount of computing tasks sent to the candidate datacenter for execution;

adjusting a computing hardware configuration of the candidate datacenter; and adjusting the amount of computing capacity dedicated to the computing task.

14. The system of claim 1, wherein the computing task comprises one or more of:

a computing model training task;

a computing model fine-tuning task;

a computing model inference task;

a computing model hosting task;

a computing model deployment task;

a computing model loading task;

a computing model execution task;

a data processing task; and a cryptocurrency mining task.

15. The system of claim 1, wherein the set of factors comprises two or more of:

computing power cost;

energy cost related to the total energy consumed for the execution of the computing task;

availability and redundancy of a datacenter;

computing performance of a datacenter;

latency in communications with a datacenter;

compliance with a regulation;

jurisdiction or region in which the computing task or a portion of the computing task is to be executed;

the environmental impact related to executing the computing task; and a type of energy source used for executing the computing task.

16. The system of claim 7, wherein the supply computing strategy comprises one or more of:

deciding between monetizing computing power or monetizing allocated energy to the datacenter according to an energy agreement;

the type of computing resources for executing the computing task;

the price of energy for executing the computing task;

maximizing monetary revenues of the candidate datacenter;

optimizing the expenses of the candidate datacenter;

maximizing profits or profit margins for the candidate datacenter;

the obligations mandated by an energy agreement between an energy source and the candidate datacenter the availability of various energy generating sources to the candidate datacenter;

maintaining or following a certain energy consumption profile over time for the candidate datacenter;

the compliance of the computing task with a data policy;

meeting financial goals of the candidate datacenter; and the environmental impact related to executing the computing task.

17. The system of claim 16, wherein the supply computing strategy comprises maximizing the profits or the profit margins for the candidate datacenter, and wherein maximizing the profits or the profit margins for the candidate datacenter includes selecting one or more computing models from a plurality of computing models for hosting on the candidate datacenter, wherein the one or more computing models produce higher profits or profit margins compared to other available computing models from the plurality of computing models, and wherein maximizing the profits or the profit margins for the candidate datacenter further includes prioritizing executing a first computing task over executing a second computing task where the first computing task produces higher profits or profit margins compared to the second computing task.

18. The system of claim 1, wherein the task routing strategy comprises one or more of:

selecting the candidate datacenter from the plurality of datacenters;

load shifting by changing the candidate datacenter from a first datacenter among the plurality of datacenter to a second datacenter among the plurality of datacenters;

a certain time at which the computing task is scheduled for execution on the candidate datacenter;

scheduling execution of the computing task on the candidate datacenter once a predetermined execution condition is met;

splitting the computing task to a plurality of computing subtasks, and scheduling a subtask from the plurality of subtasks for execution on the candidate datacenter;

selecting one or more computing models from a plurality of computing models for hosting and/or deployment on the candidate datacenter;

stopping execution of an existing computing task on the candidate datacenter and executing the computing task;

stopping execution of the computing task from the first datacenter and resuming execution of the computing task on the second datacenter; and modifying execution of the computing task by overclocking or underclocking computing hardware of the candidate datacenter.

19. The system of claim 18, wherein the computing task comprises deploying a computing model and splitting the computing task into a plurality of computing subtasks including a first subtask to host the computing model on the candidate datacenter and a second subtask to use the hosted computing model, wherein the second subtask is further split into a third subtask to load the hosted computing model on a processor of the candidate datacenter and a fourth subtask to execute a process on the loaded computing model.

20. The system of claim 18, wherein stopping execution of the computing task comprises a graceful stop comprising recording a last state and/or checkpoint related to the computing task.

21. The system of claim 20, wherein resuming the computing task comprises recalling the recorded last state and/or checkpoint related to the computing task.

22. A system for managing a computing task requested by a client, the system comprising a controller comprising a communication circuit, a processor, and a memory having stored thereon computer-executable instructions that, when executed by the processor, cause the controller to:

receive, from a client device, an initial computing model;

receive, from the client device, the computing task and a first demand computing strategy associated with the computing task, the first demand computing strategy regarding hosting the initial computing model, the first demand computing strategy indicating one or more factors selected by the client;

receive, from the client device, a second demand computing strategy associated with the computing task;

measure, by a benchmarking module, benchmarking information at a datacenter of a plurality of datacenters;

generate a plurality of supply computing specifications based on the benchmarking information, at least one supply computing specification from the plurality of supply computing specifications corresponding to the datacenter of the plurality of datacenters;

receive the plurality of supply computing specifications from the plurality of datacenters;

wherein the supply computing specification at least comprises deciding between monetizing computing power or avoiding energy consumption of the datacenter according to a compliance obligation;

calculate a task routing strategy, to reduce an energy cost and a compute cost of the computing task, based at least on the second demand computing strategy and a supply computing specification from the plurality of supply computing specifications;

select a candidate datacenter from the plurality of datacenters at least based on the task scheduling strategy for reducing the energy cost and the compute cost of the computing task;

load the initial computing model to the candidate datacenter for hosting, when the initial computing model is not hosted in the candidate datacenter;

receive, from the client device, a client request for performing the computing task using the initial computing model, with the second demand computing strategy;

determine whether the computing task is executable by the candidate datacenter according to the task routing strategy;

route the computing task for execution on the candidate datacenter according to the task routing strategy, when the computing task is executable by the candidate datacenter according to the task routing strategy;

otherwise, select a backup datacenter from the plurality of datacenters, for reducing the energy cost and the compute cost of the computing task, according to the predetermined rule; and load the initial computing model and the computing task to the backup datacenter for hosting and execution according to the task routing strategy.

23. The system of claim 22, wherein the client device is a client terminal, a user interface, an application programming interface (API), or a programming terminal.

24. A method for managing computing task orchestration, the method comprising:

receiving, by a controller, an initial computing model from a client device;

receiving, by the controller, from the client device, a first demand computing strategy regarding hosting the initial computing model;

measuring, by a benchmarking module, benchmarking information at a datacenter of a plurality of datacenters;

generating a plurality of supply computing specifications based on the benchmarking information, at least one supply computing specification from the plurality of supply computing specifications corresponding to the datacenter of the plurality of datacenters;

receiving, by the controller, from the plurality of datacenters, the plurality of supply computing specifications;

selecting, by the controller, a candidate datacenter from the plurality of datacenters according to a predetermined rule;

loading, by the controller, the initial computing model to the candidate datacenter for hosting, when the initial computing model is not hosted in the candidate datacenter;

receiving, by the controller, a client request for performing a computing task using the initial computing model, with a second demand computing strategy;

calculating, by the controller, a task routing strategy, to reduce an energy cost and a compute cost of the computing task, based at least on the second demand computing strategy and supply computing specifications of the candidate datacenter;

determining, by the controller, whether the computing task is executable by the candidate datacenter according to the task scheduling routing strategy;

routing, by the controller, the computing task for execution on the candidate datacenter according to the task routing strategy, when the computing task is executable by the candidate datacenter according to the task routing strategy;

otherwise, selecting, by the controller, a backup datacenter from the plurality of datacenters, for reducing the energy cost and the compute cost of the computing task, according to the predetermined rule; and loading, by the controller, the initial computing model and the computing task to the backup datacenter for hosting and execution according to the task routing strategy.

25. The method of claim 24, wherein the client device is a client terminal, a user interface, an application programming interface (API), or a programming terminal.

26. The method of claim 24, wherein the backup datacenter is selected based on a preferred datacenter selected by the client or by the candidate datacenter.

27. The method of claim 24, wherein the predetermined rule comprises a supply computing strategy that matches with the first demand computing strategy or optimizing a fitness function comprising the supply computing strategy.

* * * * *